US011910381B2

(12) United States Patent
Sakhnini et al.

(10) Patent No.: US 11,910,381 B2
(45) Date of Patent: Feb. 20, 2024

(54) MULTIPLEXING TECHNIQUES FOR UPLINK TRANSMISSIONS

(71) Applicant: QUALCOMM Incorporated, San Diego, CA (US)

(72) Inventors: Iyab Issam Sakhnini, San Diego, CA (US); Jing Sun, San Diego, CA (US); Tao Luo, San Diego, CA (US); Xiaoxia Zhang, San Diego, CA (US); Ahmed Abdelaziz Ibrahim Abdelaziz Zewail, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 203 days.

(21) Appl. No.: 17/396,256

(22) Filed: Aug. 6, 2021

(65) Prior Publication Data

US 2023/0039613 A1 Feb. 9, 2023

(51) Int. Cl.
*H04W 72/1268* (2023.01)
*H04W 72/23* (2023.01)

(52) U.S. Cl.
CPC ....... *H04W 72/1268* (2013.01); *H04W 72/23* (2023.01)

(58) Field of Classification Search
None
See application file for complete search history.

(56) References Cited

U.S. PATENT DOCUMENTS

| | | | | |
|---|---|---|---|---|
| 2018/0145814 A1* | 5/2018 | Liu | ....................... | H04L 5/0037 |
| 2020/0314815 A1* | 10/2020 | Kim | ....................... | H04L 1/1864 |
| 2020/0351801 A1* | 11/2020 | Jeon | ....................... | H04W 52/48 |
| 2020/0389280 A1* | 12/2020 | Li | ....................... | H04W 72/23 |
| 2021/0320760 A1* | 10/2021 | Rastegardoost | ....... | H04L 1/0061 |
| 2022/0029753 A1* | 1/2022 | Papasakellariou | .... | H04L 1/1854 |
| 2022/0039100 A1* | 2/2022 | Yoshioka | ............. | H04W 72/56 |
| 2022/0353885 A1* | 11/2022 | Cozzo | ............... | H04W 72/1268 |
| 2022/0353943 A1* | 11/2022 | Lee | ........................... | H04L 1/18 |
| 2022/0385381 A1* | 12/2022 | MolavianJazi | .......... | H04L 1/08 |
| 2023/0023656 A1* | 1/2023 | Rastegardoost | .. | H04W 72/0446 |

* cited by examiner

*Primary Examiner* — Clemence S Han
(74) *Attorney, Agent, or Firm* — Holland & Hart LLP

(57) ABSTRACT

Methods, systems, and devices for wireless communications are described. A user equipment (UE) may receive downlink control information (DCI) scheduling multiple physical uplink shared channel (PUSCH) resources for a set of uplink data messages. In some examples, the scheduled PUSCH resources may overlap with reserved or preconfigured uplink resources. The UE may determine, in accordance with a multiplexing configuration, a multiplexing schedule for multiplexing the scheduled PUSCH resources with the reserved or preconfigured uplink resources. The UE may transmit the set of uplink data messages on one or more of the scheduled PUSCH resources based on the multiplexing schedule. The described techniques may enable the UE to transmit the set of uplink data messages with improved reliability based on reducing a number of collisions between the set of uplink data messages and other uplink signals transmitted on the reserved or preconfigured uplink resources.

30 Claims, 18 Drawing Sheets

MULTIPLEXING TECHNIQUES FOR UPLINK TRANSMISSIONS

FIELD OF TECHNOLOGY

The following relates to wireless communications, including multiplexing techniques for uplink transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may receive downlink control information (DCI) from a base station that schedules multiple uplink resources for one or more uplink data messages. In some cases, however, the uplink resources scheduled by the DCI may overlap (e.g., in time, frequency, or both) with uplink resources reserved for uplink control signaling. This overlap may cause collisions between the uplink data messages and the uplink control signaling, which may reduce the likelihood of the base station successfully receiving the one or more uplink data messages.

SUMMARY

The described techniques relate to improved methods, systems, devices, and apparatuses that support multiplexing techniques for uplink transmissions. Generally, the described techniques provide for multiplexing physical uplink shared channel (PUSCH) resources with other pre-configured or reserved uplink resources. A user equipment (UE) may receive, from a base station, downlink control information (DCI) scheduling multiple PUSCH resources for a set of uplink data messages. In some examples, the scheduled PUSCH resources may overlap with a set of reserved or preconfigured uplink resources. The UE may determine, in accordance with a multiplexing configuration, a multiplexing schedule for multiplexing the scheduled PUSCH resources with the set of reserved or preconfigured uplink resources. The UE may transmit the set of uplink data messages on one or more of the scheduled PUSCH resources based on the multiplexing schedule. The described techniques may enable the UE to transmit the set of uplink data messages with improved reliability based on reducing a number of collisions between the set of uplink data messages and other uplink signals transmitted on the set of reserved or preconfigured uplink resources.

A method for wireless communications at a UE is described. The method may include receiving, from a base station, DCI that schedules multiple uplink resources for a set of uplink data messages to be transmitted by the UE, determining, in accordance with multiplexing configuration, a multiplexing schedule for multiplexing the multiple uplink resources with a set of overlapping uplink resources reserved for uplink control signaling, and transmitting the uplink control signaling and one or more uplink data messages from the set of uplink data messages based on the multiplexing schedule.

An apparatus for wireless communications at a UE is described. The apparatus may include a processor, memory coupled with the processor, and instructions stored in the memory. The instructions may be executable by the processor to cause the apparatus to receive, from a base station, DCI that schedules multiple uplink resources for a set of uplink data messages to be transmitted by the UE, determine, in accordance with multiplexing configuration, a multiplexing schedule for multiplexing the multiple uplink resources with a set of overlapping uplink resources reserved for uplink control signaling, and transmit the uplink control signaling and one or more uplink data messages from the set of uplink data messages based on the multiplexing schedule.

Another apparatus for wireless communications at a UE is described. The apparatus may include means for receiving, from a base station, DCI that schedules multiple uplink resources for a set of uplink data messages to be transmitted by the UE, means for determining, in accordance with multiplexing configuration, a multiplexing schedule for multiplexing the multiple uplink resources with a set of overlapping uplink resources reserved for uplink control signaling, and means for transmitting the uplink control signaling and one or more uplink data messages from the set of uplink data messages based on the multiplexing schedule.

A non-transitory computer-readable medium storing code for wireless communications at a UE is described. The code may include instructions executable by a processor to receive, from a base station, DCI that schedules multiple uplink resources for a set of uplink data messages to be transmitted by the UE, determine, in accordance with multiplexing configuration, a multiplexing schedule for multiplexing the multiple uplink resources with a set of overlapping uplink resources reserved for uplink control signaling, and transmit the uplink control signaling and one or more uplink data messages from the set of uplink data messages based on the multiplexing schedule.

In some examples of the method, apparatuses, and non-transitory computer-readable medium described herein, determining the multiplexing schedule may include operations, features, means, or instructions for refraining from transmitting uplink data messages on at least one uplink resource from the multiple uplink resources in accordance with the multiplexing configuration.

In some examples of the method, apparatuses, and non-transitory computer-readable medium described herein, determining the multiplexing schedule may include operations, features, means, or instructions for identifying an alternate uplink resource for transmission of at least one uplink data message from the set of uplink data messages based on a time overlap between the multiple uplink resources and the set of overlapping uplink resources reserved for uplink control signaling.

In some examples of the method, apparatuses, and non-transitory computer-readable medium described herein, transmitting the one or more uplink data messages may include operations, features, means, or instructions for transmitting the at least one uplink data message on the alternate uplink resource based on the multiplexing schedule.

In some examples of the method, apparatuses, and non-transitory computer-readable medium described herein, the multiplexing configuration includes an indication of the alternate uplink resource.

In some examples of the method, apparatuses, and non-transitory computer-readable medium described herein, determining the multiplexing schedule may include operations, features, means, or instructions for applying a frequency shift to at least one uplink resource from the multiple uplink resources based on a frequency overlap between the at least one uplink resource and the set of overlapping uplink resources reserved for uplink control signaling.

In some examples of the method, apparatuses, and non-transitory computer-readable medium described herein, transmitting the one or more uplink data messages may include operations, features, means, or instructions for transmitting at least one uplink data message from the set of uplink data messages on the at least one uplink resource based on applying the frequency shift to the at least one uplink resource.

In some examples of the method, apparatuses, and non-transitory computer-readable medium described herein, the at least one uplink data message may be frequency division multiplexed (FDM) with the uplink control signaling.

In some examples of the method, apparatuses, and non-transitory computer-readable medium described herein, the multiplexing configuration includes an indication to enable or disable the frequency shift, a shift amount for the frequency shift, or both.

Some examples of the method, apparatuses, and non-transitory computer-readable medium described herein may further include operations, features, means, or instructions for identifying one or more resource blocks (RBs) or resource elements (REs) from the multiple uplink resources that overlap with one or more RBs or REs from the set of overlapping uplink resources reserved for uplink control signaling, where determining the multiplexing schedule may be based on the identifying.

In some examples of the method, apparatuses, and non-transitory computer-readable medium described herein, receiving the DCI may include operations, features, means, or instructions for receiving, from the base station, the DCI that includes an indication to refrain from transmitting uplink data messages on at least one uplink resource from the multiple uplink resources.

Some examples of the method, apparatuses, and non-transitory computer-readable medium described herein may further include operations, features, means, or instructions for receiving an indication of the multiplexing configuration from the base station.

In some examples of the method, apparatuses, and non-transitory computer-readable medium described herein, receiving the DCI may include operations, features, means, or instructions for receiving, from the base station, the DCI that includes an indication of a time domain resource allocation (TDRA) table index corresponding to the multiple uplink resources.

In some examples of the method, apparatuses, and non-transitory computer-readable medium described herein, transmitting the uplink control signaling may include operations, features, means, or instructions for transmitting a physical random access channel (PRACH) message, a physical uplink control channel (PUCCH) message, a sounding reference signal (SRS), or a combination thereof on the set of overlapping uplink resources reserved for uplink control signaling.

In some examples of the method, apparatuses, and non-transitory computer-readable medium described herein, receiving the DCI may include operations, features, means, or instructions for receiving, from the base station, the DCI that schedules multiple PUSCH resources for a set of PUSCH messages to be transmitted by the UE.

In some examples of the method, apparatuses, and non-transitory computer-readable medium described herein, the multiple uplink resources may be continuous in the time domain. In other examples of the method, apparatuses, and non-transitory computer-readable medium described herein, the multiple uplink resources may be non-continuous in the time domain.

A method for wireless communications at a base station is described. The method may include transmitting, to a UE, DCI that schedules multiple uplink resources for a set of uplink data messages to be transmitted by the UE and receiving, from the UE and in accordance with multiplexing configuration, uplink control signaling and one or more uplink data messages from the set of uplink data messages.

An apparatus for wireless communications at a base station is described. The apparatus may include a processor, memory coupled with the processor, and instructions stored in the memory. The instructions may be executable by the processor to cause the apparatus to transmit, to a UE, DCI that schedules multiple uplink resources for a set of uplink data messages to be transmitted by the UE and receive, from the UE and in accordance with multiplexing configuration, uplink control signaling and one or more uplink data messages from the set of uplink data messages.

Another apparatus for wireless communications at a base station is described. The apparatus may include means for transmitting, to a UE, DCI that schedules multiple uplink resources for a set of uplink data messages to be transmitted by the UE and means for receiving, from the UE and in accordance with multiplexing configuration, uplink control signaling and one or more uplink data messages from the set of uplink data messages.

A non-transitory computer-readable medium storing code for wireless communications at a base station is described. The code may include instructions executable by a processor to transmit, to a UE, DCI that schedules multiple uplink resources for a set of uplink data messages to be transmitted by the UE and receive, from the UE and in accordance with multiplexing configuration, uplink control signaling and one or more uplink data messages from the set of uplink data messages.

In some examples of the method, apparatuses, and non-transitory computer-readable medium described herein, at least one uplink data message of the one or more uplink data messages may be frequency division multiplexed with the uplink control signaling.

Some examples of the method, apparatuses, and non-transitory computer-readable medium described herein may further include operations, features, means, or instructions for transmitting an indication of the multiplexing configuration to the UE, where the multiplexing configuration includes an indication to enable or disable a frequency shift for the multiple uplink resources, an indication of a shift amount for the frequency shift, an indication of an alternate uplink resource for the set of uplink data messages, or a combination thereof.

In some examples of the method, apparatuses, and non-transitory computer-readable medium described herein, transmitting the DCI may include operations, features, means, or instructions for transmitting, to the UE, the DCI that includes a TDRA table index corresponding to the multiple uplink resources.

In some examples of the method, apparatuses, and non-transitory computer-readable medium described herein, transmitting the DCI may include operations, features, means, or instructions for transmitting, to the UE, the DCI that includes an indication to refrain from transmitting uplink data messages on at least one uplink resource from the multiple uplink resources.

In some examples of the method, apparatuses, and non-transitory computer-readable medium described herein, receiving the uplink control signaling may include operations, features, means, or instructions for receiving a PRACH message, a PUCCH message, an SRS, or a combination thereof from the UE on a set of uplink resources that may be reserved for uplink control signaling.

In some examples of the method, apparatuses, and non-transitory computer-readable medium described herein, transmitting the DCI may include operations, features, means, or instructions for transmitting, to the UE, the DCI that schedules multiple PUSCH resources for a set of PUSCH messages to be transmitted by the UE.

In some examples of the method, apparatuses, and non-transitory computer-readable medium described herein, the multiple uplink resources may be continuous in the time domain. In other examples of the method, apparatuses, and non-transitory computer-readable medium described herein, the multiple uplink resources may be non-continuous in the time domain.

DETAILED DESCRIPTION

Figure 1:
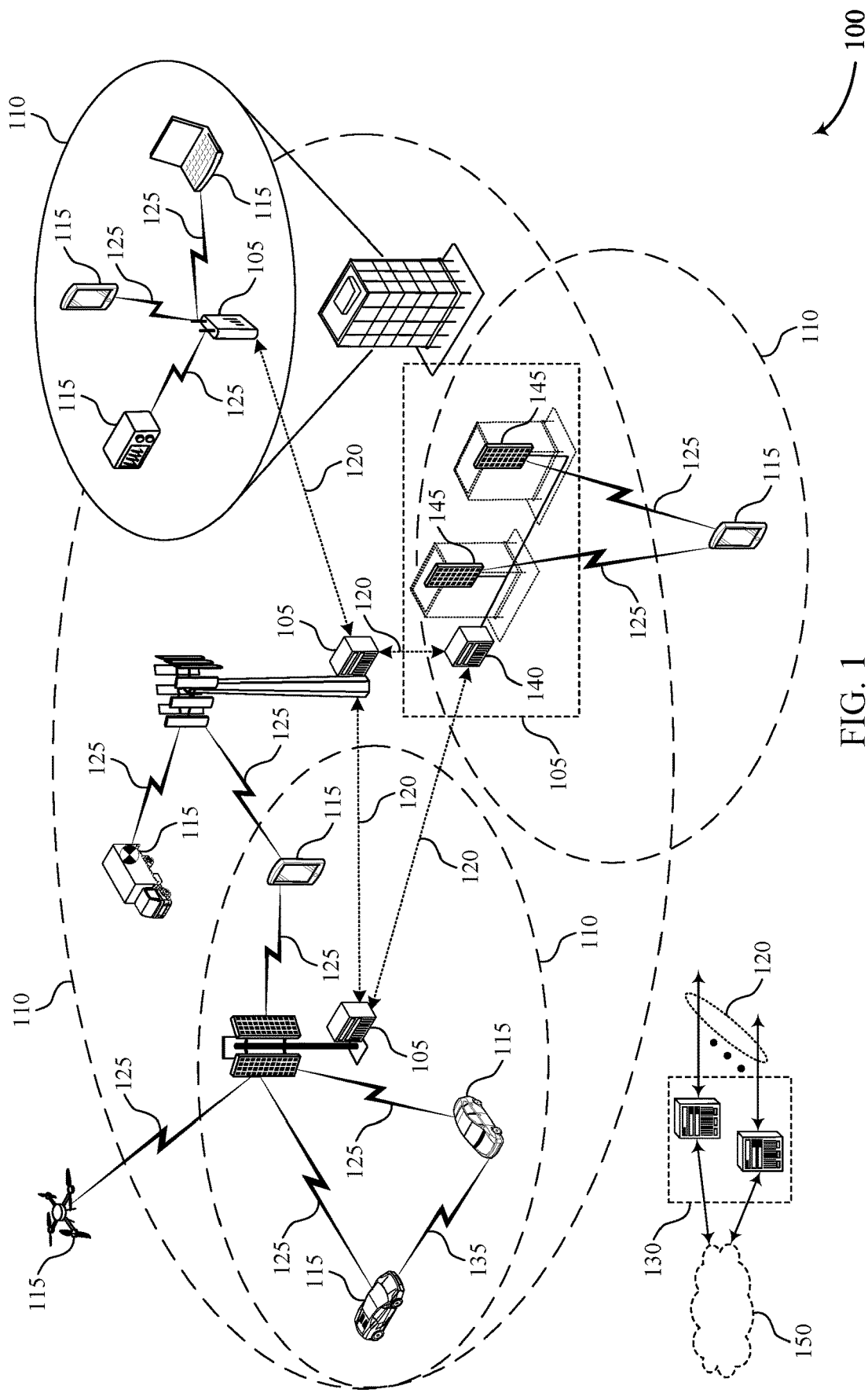
FIGS. 1 and 2 illustrate examples of wireless communications systems that support multiplexing techniques for uplink transmissions in accordance with aspects of the present disclosure.

In some wireless communications, a user equipment (UE) may receive downlink control information (DCI) from a base station that schedules multiple physical uplink shared channel (PUSCH) resources for uplink data messages to be transmitted from the UE to the base station. In some cases, however, the PUSCH resources scheduled by the DCI may overlap (e.g., in the time domain, the frequency domain, or both) with other uplink resources that are preconfigured or reserved (e.g., for uplink control signaling). For example, the scheduled PUSCH resources may overlap with a physical random access channel (PRACH) resource, a physical uplink control channel (PUCCH) resource, or a sounding reference signal (SRS) resource, among other examples. This overlap may increase the likelihood of collisions between the uplink data messages and signals transmitted on the other uplink resources, which may reduce the reliability of communications between the UE and the base station.

In accordance with aspects of the present disclosure, the UE may reduce the likelihood of collisions between the scheduled PUSCH resources and the other (e.g., preconfigured or reserved) uplink resources by determining a multiplexing schedule for the scheduled PUSCH resources. In some examples, the multiplexing schedule may include selectively dropping (e.g., refraining from transmitting on) scheduled PUSCH resources that overlap with the other uplink resources. In other examples, the multiplexing schedule may include applying a frequency shift to scheduled PUSCH resources that overlap with the other uplink resources. Additionally or alternatively, the multiplexing schedule may include using alternate PUSCH resources or recovering dropped PUSCH resources (e.g., shifting dropped PUSCH resources to a later time). Transmitting the uplink data messages on the scheduled PUSCH resources in accordance with the determined multiplexing schedule may improve the likelihood of the uplink data messages being successfully received by the base station.

In some examples, the UE may determine the multiplexing schedule based on a multiplexing configuration. The multiplexing configuration may include an indication to enable or disable dropping for the scheduled PUSCH resources, an indication to enable or disable frequency shifting for the scheduled PUSCH resources, an indication of a frequency shift amount, or an indication of an alternate PUSCH resource, among other examples. In some examples, the UE may receive an indication of the multiplexing configuration from the base station (e.g., via control signaling). In other examples, the UE may be preconfigured with the multiplexing configuration. The UE may also determine the multiplexing schedule based on one or more fields (e.g., a mask) in the DCI. The one or more fields may indicate which scheduled PUSCH resources are to be dropped and which scheduled PUSCH resources are to be used for transmission of the uplink data messages.

Aspects of the present disclosure may be implemented to realize one or more of the following advantages. The described techniques may provide for improved uplink communications between the UE and the base station. For example, the described techniques may enable the UE to multiplex the uplink data messages (e.g., a multi-PUSCH transmission) with other uplink signals (e.g., SRS, PUCCH, PRACH), which may increase the likelihood of the uplink data messages being successfully received by the base station. The described techniques may also provide for reduced signaling overhead based on configuring the UE with the multiplexing configuration. Specifically, configuring the UE with the multiplexing configuration may enable the base station to schedule multiple PUSCH resources without specifying all possible collision combinations for the scheduled PUSCH resources, which may reduce the signaling overhead associated with multi-PUSCH scheduling.

Aspects of the disclosure are initially described in the context of wireless communications systems, multiplexing schedules, and process flows. Aspects of the disclosure are further illustrated by and described with reference to apparatus diagrams, system diagrams, and flowcharts that relate to multiplexing techniques for uplink transmissions.

FIG. 1 illustrates an example of a wireless communications system 100 that supports multiplexing techniques for uplink transmissions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element (RE) may include one symbol period (e.g., a duration of one modulation symbol) and one subcarrier, where the symbol period and subcarrier spacing are inversely related. The number of bits carried by each RE may depend on the modulation scheme (e.g., the order of the modulation scheme, the coding rate of the modulation scheme, or both). Thus, the more REs that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., N f) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some wireless communications systems may support NR operations in various radio frequency spectrum bands (e.g., between 52.6 GHz and 71 GHz). In some examples, multi-PUSCH scheduling may be used to support such NR operations. Multi-PUSCH scheduling may refer to scheduling multiple (e.g., up to 8) PUSCH resources with a single instance of DCI. That is, a single instance of DCI may schedule up to 8 different PUSCH resources. In addition to multi-PUSCH scheduling, some wireless communications systems may support enhancements for multi-PDSCH scheduling, multi-PUSCH scheduling, and HARQ support with a single instance of DCI. In some cases, these enhancements may apply to specific subcarrier spacing (SCS) values (e.g., 120 kHz and 480 kHz). In other words, these enhancements may depend on a capability of a UE to select between different SCS values.

For a DCI that can schedule multiple PUSCH resources, a time domain resource allocation (TDRA) table may be extended such that each row of the TDRA table indicates up to 8 PUSCH resources, which may be contiguous or non-contiguous in the time domain. Each PUSCH resource may be associated with a separate start and length indicator value (SLIV) and a mapping type. The number of scheduled PUSCH resources may be implicitly indicated by a number of indicated (and valid) SLIVs in a row of the TDRA table that is signaled in the DCI. Thus, a single DCI may schedule up to 8 PUSCH resources, and a TDRA table may be extended such that each row of the TDRA table indicates up to 8 PUSCH resources. In some cases, the TDRA table may be preconfigured or RRC configured (e.g., configured via RRC signaling).

In some cases, however, one or more PUSCH resources scheduled by a DCI may collide (e.g., in the time domain, the frequency domain, or both) with a preconfigured uplink channel (e.g., a PRACH or random access channel (RACH) occasion (RO), a PUCCH, or an SRS). For instances of DCI scheduling a single PUSCH resource, a base station 105 may mitigate (e.g., prevent) such collisions. But for instances of DCI that schedule up to 8 PUSCH resources (e.g., a multi-PUSCH resource allocation), mitigating such collisions may result in higher processing costs, greater scheduling complexities, and delays. Similarly, configuring a TDRA table to mitigate such collisions may involve configuring all possible collision combinations in the TDRA table such that a specific collision combination can be indicated via DCI. However, configuring the TDRA table in such a manner may result in higher signaling overhead and a relatively inefficient (e.g., large) TDRA table structure.

In accordance with aspects of the present disclosure, the wireless communications system 100 may support techniques for improved uplink communications between a UE 115 and a base station 105. For example, the described techniques may enable the UE 115 to multiplex a multi-PUSCH transmission with other uplink transmissions (e.g., SRS, PUCCH, PRACH) in accordance with a multiplexing configuration, which may increase the likelihood of the base station 105 successfully receiving the multi-PUSCH transmission and the other uplink transmissions. The described techniques may also enable the base station 105 to employ a more efficient (e.g., smaller) TDRA table structure, which may reduce the signaling overhead associated with multi-PUSCH scheduling, among other benefits.

Figure 2:
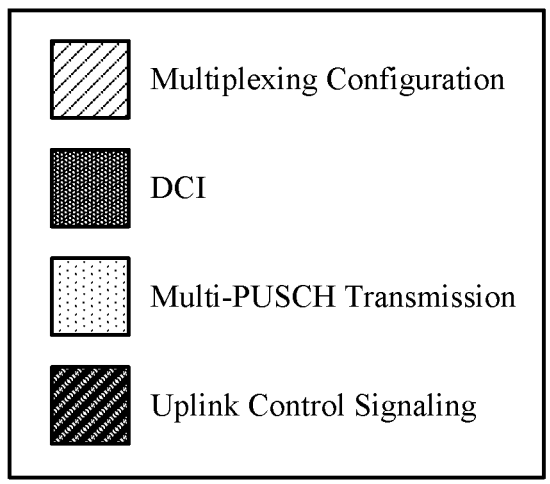
Figure 2:
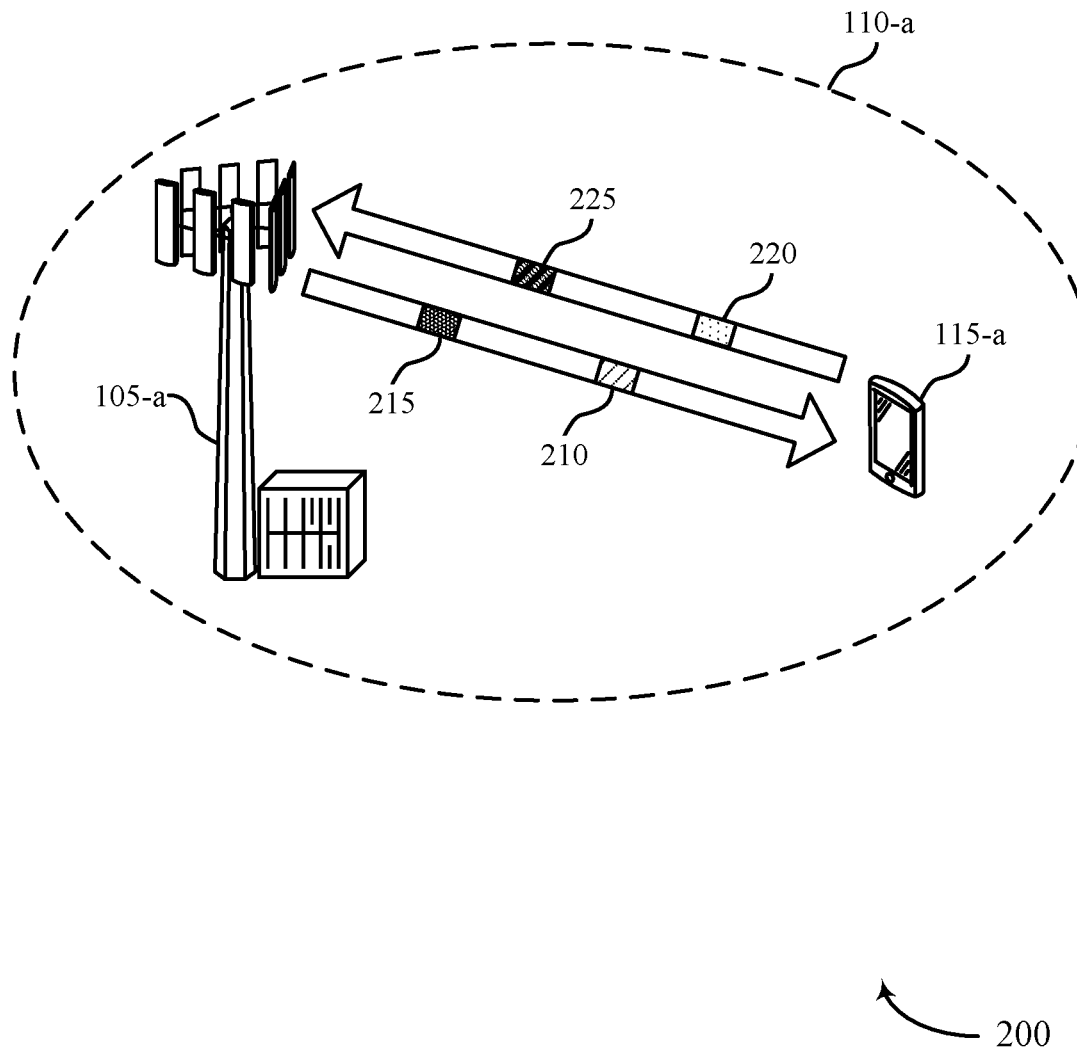

FIG. 2 illustrates an example of a wireless communications system 200 that supports multiplexing techniques for uplink transmissions in accordance with aspects of the present disclosure. The wireless communications system 200 may implement or be implemented by aspects of wireless communications system 100. For example, the wireless communications system 200 may include a UE 115-a and a base station 105-a, which may be examples of corresponding devices described with reference to FIG. 1. The base station 105-a and the UE 115-a may communicate within a geographic coverage area 110-a of the base station 105-a, which may be an example of a geographic coverage area 110 described with reference to FIG. 1. In the wireless communications system 200, the UE 115-a may transmit a multi-PUSCH transmission 220 (e.g., one or more uplink data messages) and uplink control signaling 225 in accordance with a multiplexing configuration 210.

As described with reference to FIG. 1, the base station 105-a may transmit a DCI 215 to the UE 115-a that schedules multiple (e.g., up to 8) PUSCH resources for the multi-PUSCH transmission 220 (e.g., a multi-PUSCH burst). In some cases, however, one or more of the scheduled PUSCH resources may overlap (e.g., in time, frequency, or both) with other preconfigured or reserved uplink resources. For example, the scheduled PUSCH resources may overlap with a PRACH resource, a PUCCH resource, or an SRS resource, among other examples. In such cases, there may be collisions between the multi-PUSCH transmission 220 and other signals transmitted on the preconfigured or reserved resources, which may decrease the likelihood of the base station 105-a successfully receiving the multi-PUSCH transmission 220.

In accordance with the described techniques, the UE 115-a may transmit the multi-PUSCH transmission 220 with improved reliability by determining a multiplexing schedule for the scheduled PUSCH resources (e.g., the multi-PUSCH resource allocation). That is, the UE 115-a may use a multiplexing schedule to multiplex the scheduled PUSCH resources with the preconfigured or reserved uplink resources, which may enable the UE 115-*a* to transmit the multi-PUSCH transmission 220 (e.g., on the scheduled PUSCH resources) and the uplink control signaling 225 (e.g., on the preconfigured or reserved uplink resources) with fewer collisions and greater reliability, among other benefits. The described techniques may also enable the base station 105-*a* to schedule the multi-PUSCH transmission 220 with reduced signaling overhead (e.g., based on employing a more efficient TDRA table structure), as described with reference to FIG. 1

As an example, the UE 115-*a* may determine that one or more of the PUSCH resources scheduled by the DCI 215 overlap with one or more preconfigured or reserved uplink resources. Specifically, the UE 115-*a* may determine that one or more resource blocks (RBs) or REs of the scheduled PUSCH resources overlap with one or more preconfigured or reserved uplink resources. Alternatively, the UE 115-*a* may determine that there is a time domain overlap between one or more of the scheduled PUSCH resources and one or more preconfigured or reserved uplink resources. After identifying an overlap between the scheduled PUSCH resources and the preconfigured or reserved uplink resources, the UE 115-*a* may determine a multiplexing schedule for the scheduled PUSCH resources.

In some examples, the multiplexing schedule may involve implicitly skipping or dropping scheduled PUSCH resources that overlap with the preconfigured or reserved uplink resources. If the UE 115-*a* drops a scheduled PUSCH resource based on the multiplexing schedule, the UE 115-*a* may recover (e.g., add) the dropped PUSCH resource at the end of the multi-PUSCH resource allocation (e.g., subsequent to the multi-PUSCH burst). Alternatively, the UE 115-*a* may refrain from recovering dropped PUSCH resources. In some examples, the UE 115-*a* may determine whether to drop a scheduled PUSCH resource based on one or more fields (e.g., a mask) in the DCI 215. That is, the DCI 215 may configure the UE 115-*a* to drop (e.g., refrain from transmitting on) one or more PUSCH resources in the multi-PUSCH resource allocation.

In other examples, the multiplexing schedule may involve implicitly applying a frequency shift to scheduled PUSCH resources that overlap with the preconfigured or reserved uplink resources such that the shifted PUSCH resources are multiplexed (e.g., using FDM) with the preconfigured or reserved uplink resources. That is, one or more of the scheduled PUSCH resources may be transmitted using a first frequency (e.g., $f_1$) and one or more of the scheduled PUSCH resources may be transmitted using a second frequency (e.g., $f_2$), where the second frequency is multiplexed with the preconfigured or reserved uplink resources in an FDM manner.

In some examples, the UE 115-*a* may determine the multiplexing schedule based on receiving an indication of the multiplexing configuration 210 from the base station 105-*a*. The multiplexing configuration 210 may include an indication to enable or disable dropping for the scheduled PUSCH resources, an indication to enable or disable frequency shifting for the scheduled PUSCH resources, an indication of a frequency shift amount (e.g., if frequency shifting is enabled), an indication of an alternate PUSCH resource (e.g., for recovering dropped PUSCH resources), or a combination thereof. In some examples, the base station 105-*a* may configure the UE 115-*a* with the multiplexing configuration 210 via control signaling, which may include RRC signaling, a MAC-CE, or DCI, among other examples.

The wireless communications system 200 may support techniques for improved uplink communications between the UE 115-*a* and the base station 105-*a*. For example, the described techniques may enable the UE 115-*a* to multiplex the multi-PUSCH transmission 220 with the uplink control signaling 225 (e.g., SRS, PUCCH, PRACH) in accordance with the multiplexing configuration 210, which may increase the likelihood of the base station 105-*a* successfully receiving the multi-PUSCH transmission 220, the uplink control signaling 225, or both. The described techniques may also enable the base station 105-*a* to employ a more efficient TDRA table structure, which may reduce the signaling overhead associated with multi-PUSCH scheduling, among other benefits.

Figure 3:
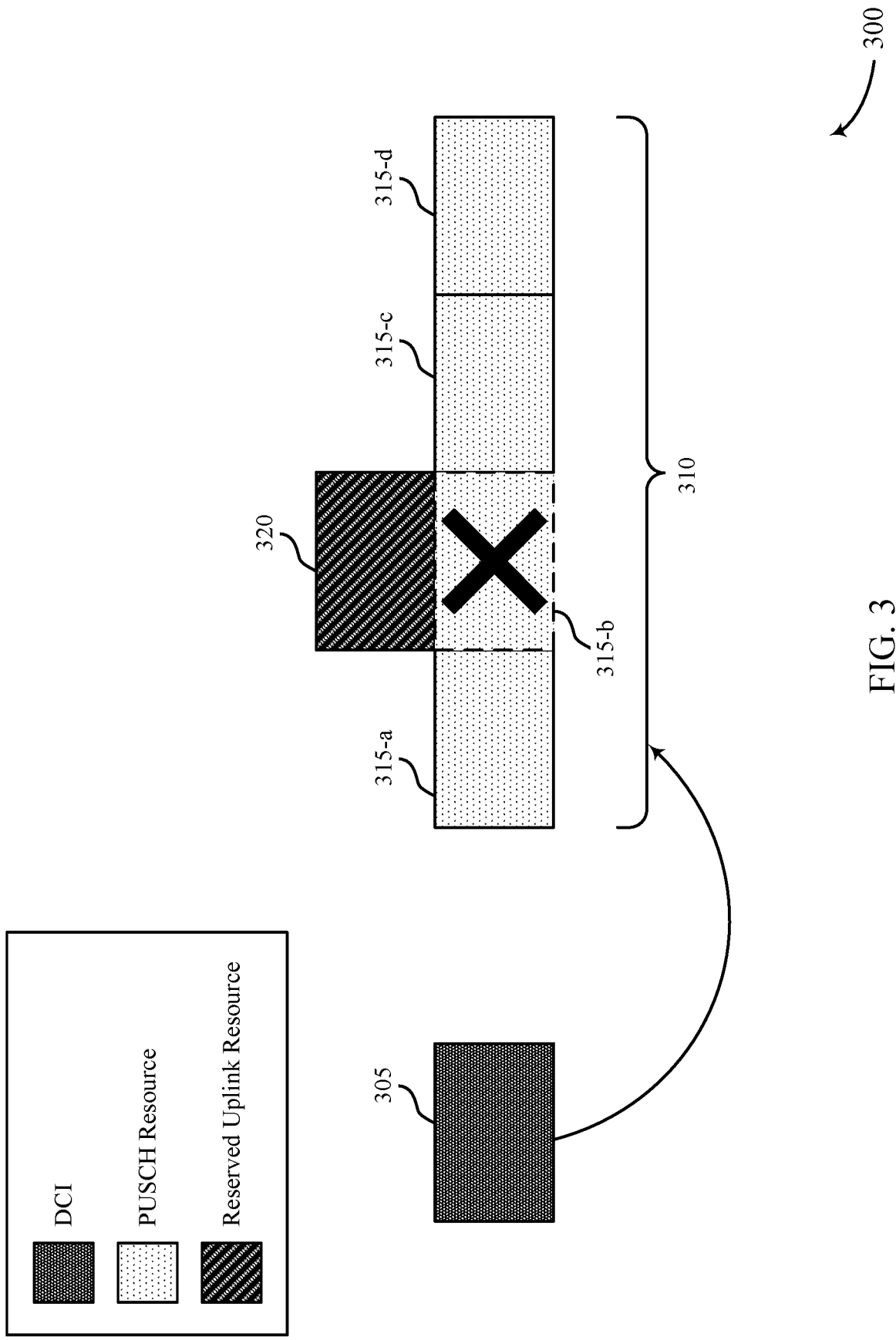
FIGS. 3 through 5 illustrate examples of multiplexing schedules that support multiplexing techniques for uplink transmissions in accordance with aspects of the present disclosure.

FIG. 3 illustrates an example of a multiplexing schedule 300 that supports multiplexing techniques for uplink transmissions in accordance with aspects of the present disclosure. The multiplexing schedule 300 may implement or be implemented by aspects of the wireless communications system 100 or the wireless communications system 200. For example, the multiplexing schedule 300 may be implemented by a UE, which may be an example of a UE 115 described with reference to FIGS. 1 and 2. In accordance with the multiplexing schedule 300, the UE may drop (e.g., refrain from transmitting on) a PUSCH resource 315-*b* that overlaps with a reserved uplink resource 320.

As described with reference to FIGS. 1 and 2, a UE may receive DCI 305 (e.g., from a base station) that schedules a multi-PUSCH resource allocation 310 for a multi-PUSCH transmission from the UE. The multi-PUSCH resource allocation 310 may include multiple (e.g., up to 8) PUSCH resources 315, which may be contiguous or non-contiguous in the time domain. In some examples, the UE may be configured with a TDRA table, and the DCI 305 may indicate a specific index of the TDRA table corresponding to the multi-PUSCH resource allocation 310. For example, the DCI 305 may indicate a row of the TDRA table that includes a PUSCH resource 315-*a*, a PUSCH resource 315-*b*, a PUSCH resource 315-*c*, and a PUSCH resource 315-*d*.

In some cases, one or more of the PUSCH resources 315 in the multi-PUSCH resource allocation 310 may overlap (e.g., in time, frequency, or both) with a reserved uplink resource 320, which may be an example of a PRACH resource, a PUCCH resource, or an SRS resource, among other examples. This overlap may increase the likelihood of collisions between the multi-PUSCH transmission and uplink signals transmitted on the reserved uplink resource 320, which may reduce the reliability of communications between the UE and the base station. In some cases, the base station may mitigate such collisions by configuring the UE with a TDRA table structure that includes all possible collision combinations for the multi-PUSCH resource allocation 310. However, employing such a TDRA table structure may result in prohibitive signaling overhead and higher processing costs.

In the example of FIG. 3, the UE may reduce the likelihood of collisions between the multi-PUSCH resource allocation 310 and the reserved uplink resource 320 by dropping one or more of the PUSCH resources 315. For example, if the PUSCH resource 315-*b* overlaps with the reserved uplink resource 320, the UE may refrain from using the PUSCH resource 315-*b*. In some examples, the UE may recover the PUSCH resource 315-*b* at the end of the multi-PUSCH transmission (as described with reference to FIG. 4). In other examples, however, the UE may not recover the PUSCH resource 315-*b*. That is, the UE may skip the PUSCH resource 315-*b* rather than using an alternative PUSCH resource or shifting the PUSCH resource 315-*b* to a later time.

In some examples, the UE may determine to drop the PUSCH resource 315-*b* based on one or more fields (e.g., a mask) in the DCI 305. That is, the DCI 305 may implicitly configure the UE not to use the PUSCH resource 315-*b* for the multi-PUSCH transmission. Additionally or alternatively, the UE may determine to drop the PUSCH resource 315-*b* based on a multiplexing configuration, which may include an indication to enable or disable dropping for the PUSCH resources 315 of the multi-PUSCH resource allocation 310. In some examples, the UE may be preconfigured with the multiplexing configuration. In other examples, the UE may receive control signaling (e.g., RRC, a MAC-CE, or DCI) that indicates the multiplexing configuration.

The multiplexing schedule 300 may support techniques for improved uplink communications between a UE and a base station. For example, the described techniques may enable the UE to reduce collisions between the PUSCH resource 315-*b* and the reserved uplink resource 320 based on dropping the PUSCH resource 315-*b*. Dropping the PUSCH resource 315-*b* may increase the likelihood of the base station successfully receiving uplink signals (e.g., PRACH, PUCCH, SRS) transmitted on the reserved uplink resource 320. The described techniques may also enable the base station to employ a more efficient (e.g., smaller) TDRA table structure, which may reduce the signaling overhead associated with multi-PUSCH scheduling, among other benefits.

Figure 4:
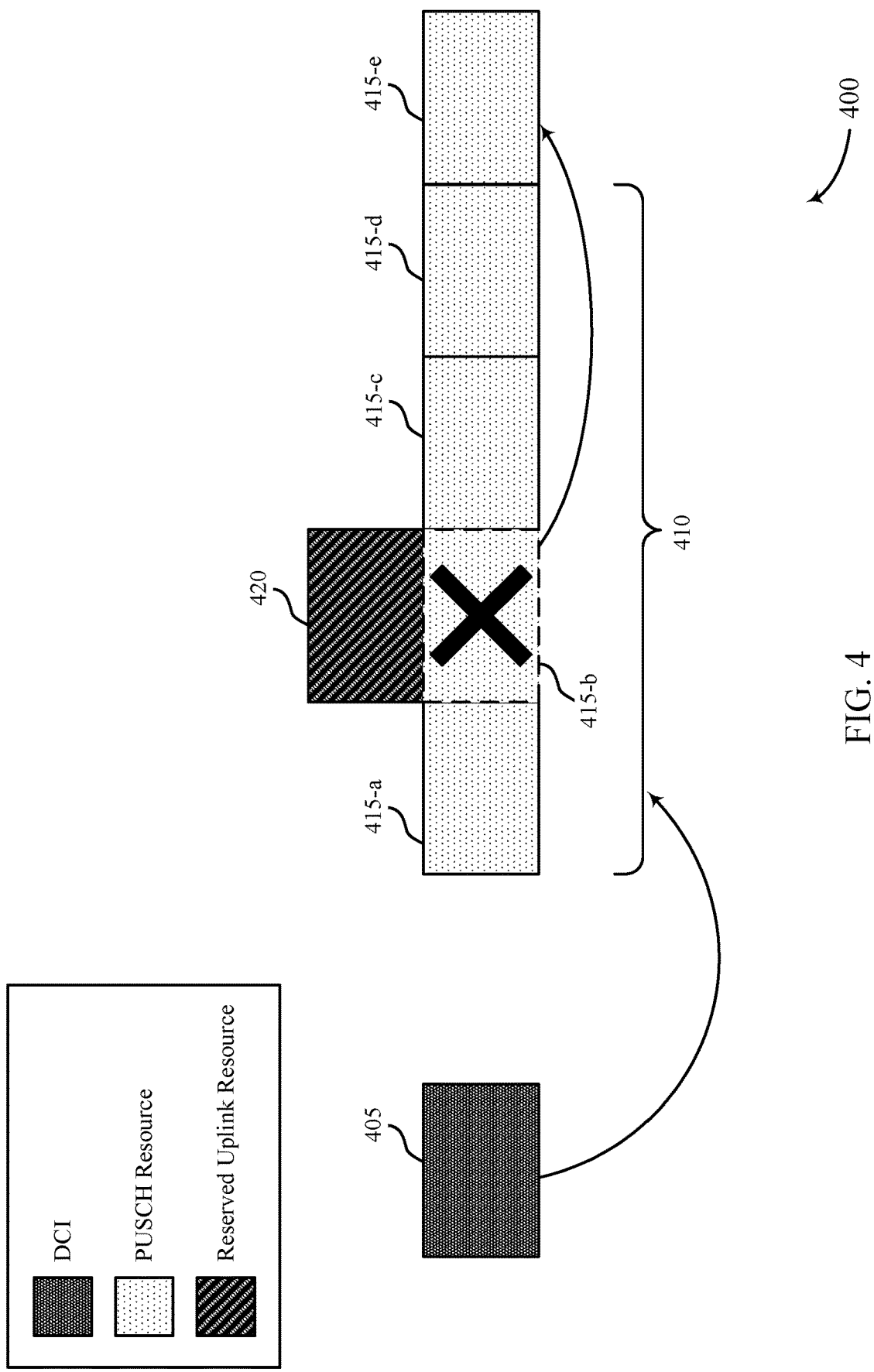

FIG. 4 illustrates an example of a multiplexing schedule 400 that supports multiplexing techniques for uplink transmissions in accordance with aspects of the present disclosure. The multiplexing schedule 400 may implement or be implemented by aspects of the wireless communications system 100 or the wireless communications system 200. For example, the multiplexing schedule 400 may be implemented by a UE, which may be an example of a UE 115 described with reference to FIGS. 1 and 2. In accordance with the multiplexing schedule 400, the UE may transmit a multi-PUSCH transmission on a PUSCH resource 415-*e* (e.g., an alternate PUSCH resource) based on identifying an overlap between a PUSCH resource 415-*b* and a reserved uplink resource 420.

As described with reference to FIGS. 1 through 3, a UE may receive DCI 405 (e.g., from a base station) that schedules a multi-PUSCH resource allocation 410 for a multi-PUSCH transmission from the UE. The multi-PUSCH resource allocation 410 may include multiple (e.g., up to 8) PUSCH resources 415, which may be contiguous or non-contiguous in the time domain. In some examples, the UE may be configured with a TDRA table, and the DCI 405 may indicate a specific index of the TDRA table corresponding to the multi-PUSCH resource allocation 410. For example, the DCI 405 may indicate a row of the TDRA table that includes a PUSCH resource 415-*a*, a PUSCH resource 415-*b*, a PUSCH resource 415-*c*, and a PUSCH resource 415-*d*.

In some cases, one or more of the PUSCH resources 415 in the multi-PUSCH resource allocation 410 may overlap (e.g., in time, frequency, or both) with a reserved uplink resource 420, which may be an example of a PRACH resource, a PUCCH resource, or an SRS resource, among other examples. This overlap may increase the likelihood of collisions between the multi-PUSCH transmission and uplink signals transmitted on the reserved uplink resource 420, which may reduce the reliability of communications between the UE and the base station. In some cases, the base station may mitigate such collisions by configuring the UE with a TDRA table structure that includes all possible collision combinations for the multi-PUSCH resource allocation 410. However, employing such a TDRA table structure may result in prohibitive signaling overhead and higher processing costs.

In the example of FIG. 4, the UE may reduce the likelihood of collisions between the multi-PUSCH resource allocation 410 and the reserved uplink resource 420 by dropping one or more of the PUSCH resources 415. For example, if the PUSCH resource 415-*b* overlaps with the reserved uplink resource 420, the UE may refrain from using the PUSCH resource 415-*b*. Instead, the UE may use a PUSCH resource 415-*e* (e.g., an alternate PUSCH resource) for the multi-PUSCH transmission. That is, the UE may recover dropped PUSCH resources at the end of the multi-PUSCH resource allocation 410. In some examples, the UE may select the PUSCH resource 415-*e* based on a multiplexing configuration, which may be preconfigured or received via control signaling (e.g., RRC signaling, a MAC-CE, or DCI).

The multiplexing schedule 400 may support techniques for improved uplink communications between a UE and a base station. For example, the described techniques may enable the UE to reduce collisions between the PUSCH resource 415-*b* and the reserved uplink resource 420 based on dropping the PUSCH resource 415-*b*. Dropping the PUSCH resource 415-*b* (and using the PUSCH resource 415-*e* instead) may increase the likelihood of the base station successfully receiving uplink signals (e.g., PRACH, PUCCH, SRS) transmitted on the reserved uplink resource 420. The described techniques may also enable the base station to employ a more efficient (e.g., smaller) TDRA table structure, which may reduce the signaling overhead associated with multi-PUSCH scheduling, among other benefits.

Figure 5:
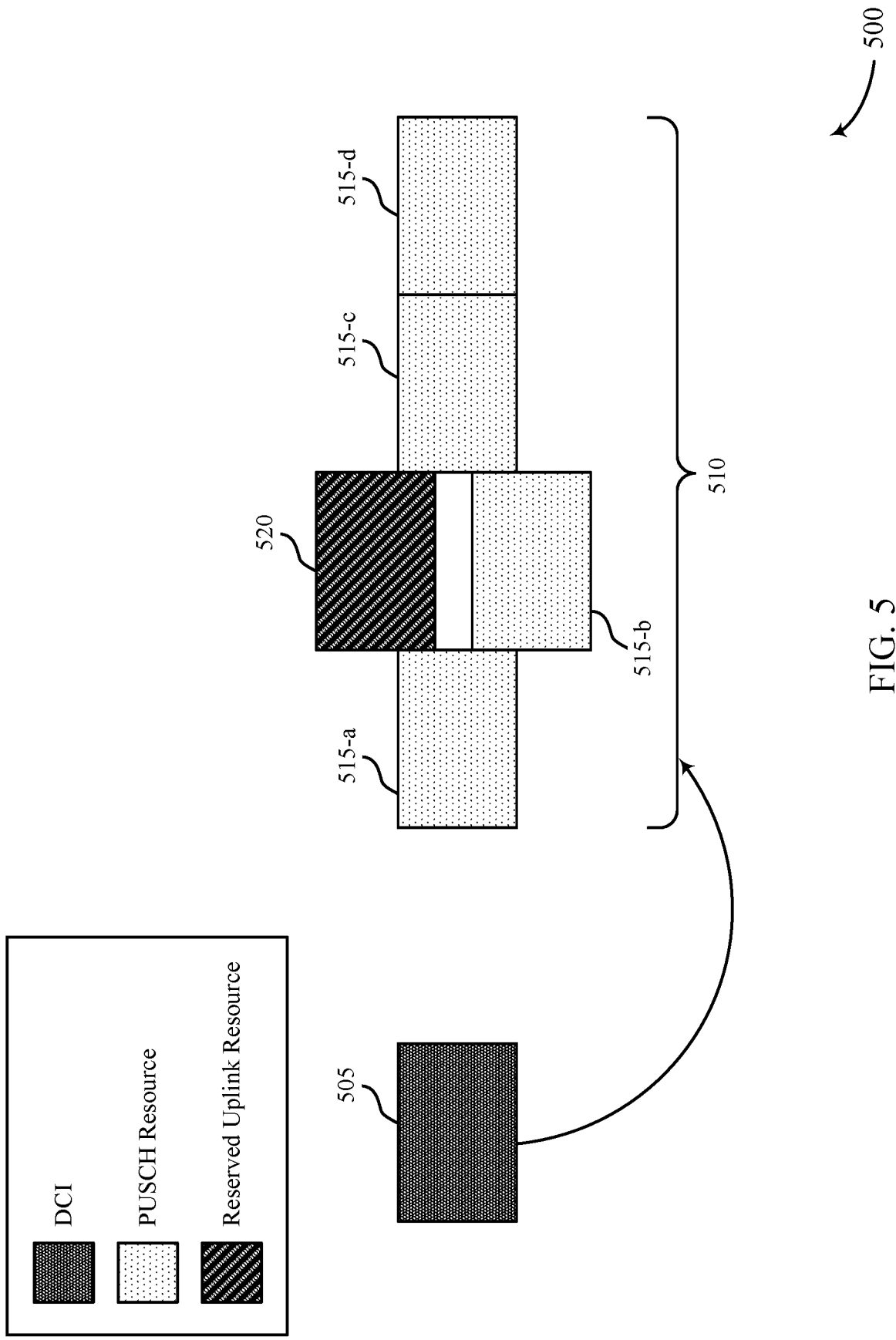

FIG. 5 illustrates an example of a multiplexing schedule 500 that supports multiplexing techniques for uplink transmissions in accordance with aspects of the present disclosure. The multiplexing schedule 500 may implement or be implemented by aspects of the wireless communications system 100 or the wireless communications system 200. For example, the multiplexing schedule 500 may be implemented by a UE, which may be an example of a UE 115 described with reference to FIGS. 1 and 2. In accordance with the multiplexing schedule 500, the UE may apply a frequency shift to a PUSCH resource 515-*b* based on identifying an overlap between the PUSCH resource 515-*b* and a reserved uplink resource 520.

As described with reference to FIGS. 1 through 4, a UE may receive DCI 505 (e.g., from a base station) that schedules a multi-PUSCH resource allocation 510 for a multi-PUSCH transmission from the UE. The multi-PUSCH resource allocation 510 may include multiple (e.g., up to 8) PUSCH resources 515, which may be contiguous or non-contiguous in the time domain. In some examples, the UE may be configured with a TDRA table, and the DCI 505 may indicate a specific index of the TDRA table corresponding to the multi-PUSCH resource allocation 510. For example, the DCI 505 may indicate a row of the TDRA table that includes a PUSCH resource 515-*a*, a PUSCH resource 515-*b*, a PUSCH resource 515-*c*, and a PUSCH resource 515-*d*.

In some cases, one or more of the PUSCH resources 515 in the multi-PUSCH resource allocation 510 may overlap (e.g., in time, frequency, or both) with a reserved uplink resource 520, which may be an example of a PRACH resource, a PUCCH resource, or an SRS resource, among other examples. This overlap may increase the likelihood of collisions between the multi-PUSCH transmission and uplink signals transmitted on the reserved uplink resource 520, which may reduce the reliability of communications between the UE and the base station. In some cases, the base station may mitigate such collisions by configuring the UE with a TDRA table structure that includes all possible collision combinations for the multi-PUSCH resource allocation 510. However, employing such a TDRA table structure may result in prohibitive signaling overhead and higher processing costs.

In the example of FIG. 5, the UE may reduce collisions between the PUSCH resources 515 and the reserved uplink resource 520 by applying a frequency shift to the PUSCH resources 515 that overlap with the reserved uplink resource 520. For example, if the PUSCH resource 515-b overlaps with the reserved uplink resource 520, the UE may (implicitly) apply a frequency shift to the PUSCH resource 515-b such that the PUSCH resource 515-b is multiplexed with the reserved uplink resource 520 in an FDM manner. In some examples, the UE may apply the frequency shift to the PUSCH resource 515-b in accordance with a multiplexing configuration, which may be preconfigured or received via control signaling (e.g., RRC signaling, a MAC-CE, or DCI). Specifically, the multiplexing configuration may include an indication to enable or disable frequency shifting for the PUSCH resources 515, a frequency shift amount, or both.

The multiplexing schedule 500 may support techniques for improved uplink communications between a UE and a base station. For example, the described techniques may enable the UE to multiplex the PUSCH resource 515-b with the reserved uplink resource 520 in accordance with a multiplexing configuration, which may increase the likelihood of the base station successfully receiving uplink communications (e.g., multi-PUSCH transmissions, uplink control signaling) from the UE on the PUSCH resource 515-b and the reserved uplink resource 520. The described techniques may also enable the base station to employ a more efficient TDRA table structure, which may reduce the signaling overhead associated with multi-PUSCH scheduling, among other benefits.

Figure 6:
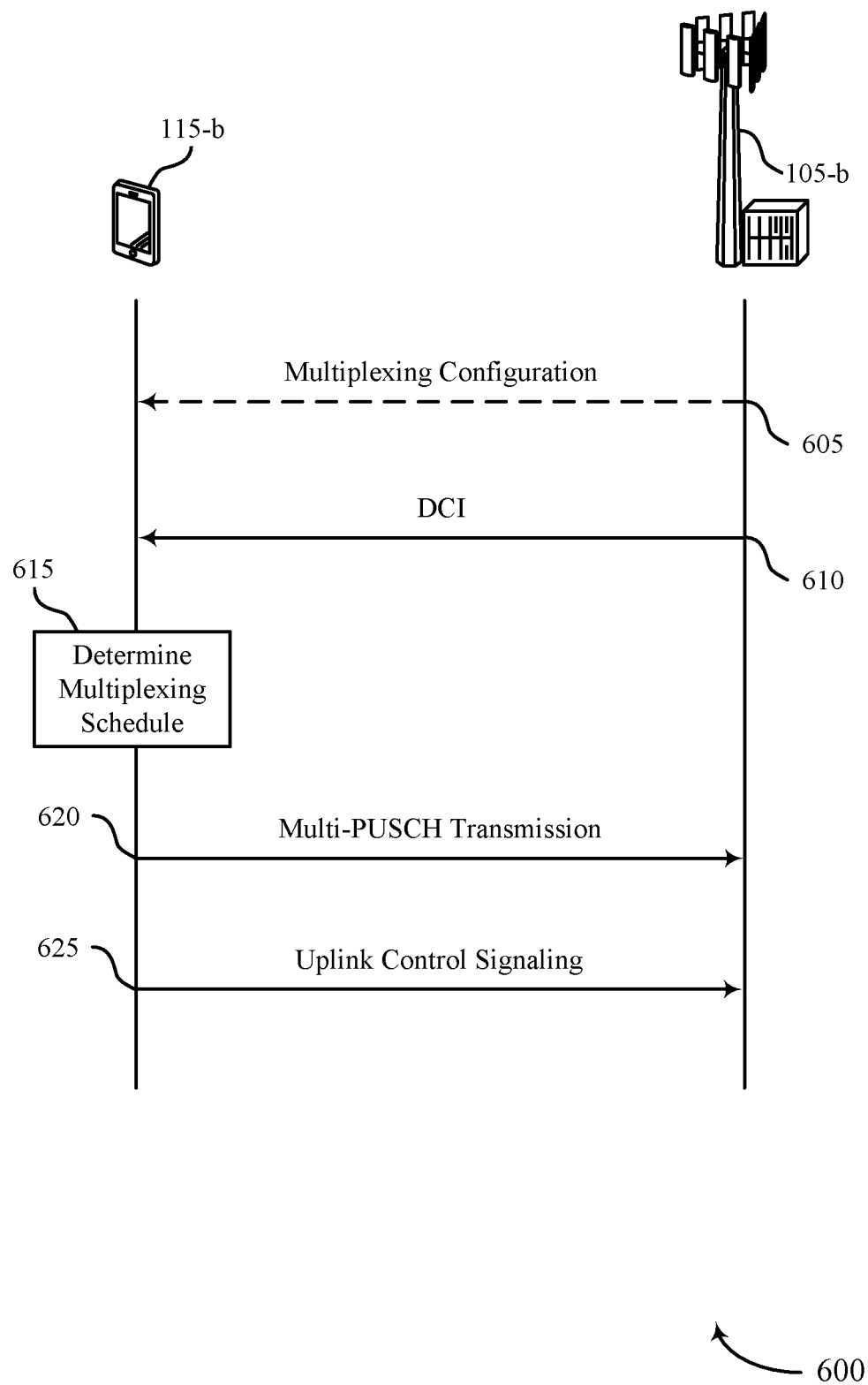
FIG. 6 illustrates an example of a process flow that supports multiplexing techniques for uplink transmissions in accordance with aspects of the present disclosure.

FIG. 6 illustrates an example of a process flow 600 that supports multiplexing techniques for uplink transmissions in accordance with aspects of the present disclosure. The process flow 600 may implement or be implemented by aspects of the wireless communications system 100 or the wireless communications system 200. For example, the process flow 600 may include a UE 115-b and a base station 105-b, which may be examples of corresponding devices described with reference to FIGS. 1 and 2. In the following description of the process flow 600, operations between the UE 115-b and the base station 105-b may be performed in a different order or at a different time than as shown. Additionally or alternatively, some operations may be omitted from the process flow 600, and other operations may be added to the process flow 600.

In some example, the base station 105-b may transmit an indication of a multiplexing configuration to the UE 115-b. The multiplexing configuration may include an indication to enable or disable frequency shifting for multi-PUSCH resource allocations, an indication of a frequency shift amount (e.g., if frequency shifting is enabled), or an indication of alternate PUSCH resource locations, among other examples. In some examples, the base station 105-b may indicate the multiplexing configuration via control signaling, which may include RRC signaling, a MAC-CE, or DCI. In other examples, the UE 115-b may be preconfigured with the multiplexing configuration.

At 610, the base station 105-b may transmit a DCI to the UE 115-b that schedules multiple uplink resources for a set of uplink data messages (e.g., a multi-PUSCH transmission) to be transmitted by the UE 115-b. Specifically, the DCI may schedule up to 8 PUSCH resources, which may be continuous or non-continuous in the time domain. In some examples, the UE 115-b may be configured with a TDRA table, and the DCI may indicate a specific row of the TDRA table that corresponds to the multiple uplink resources. In some examples, the DCI may include an indication to refrain from using at least one uplink resource of the multiple uplink resources.

At 615, the UE 115-b may determine, in accordance with the multiplexing configuration, a multiplexing schedule for multiplexing the multiple uplink resources with a set of overlapping uplink resources (e.g., preconfigured uplink resources) reserved for uplink control signaling. In some examples, the UE 115-b may determine the multiplexing schedule based on identifying an overlap between one or more REs or RBs from the multiple uplink resources and one or more REs or RBs from the set of overlapping uplink resources.

At 620, the UE 115-b may transmit one or more uplink data messages from the set of uplink data messages based on the multiplexing schedule. In some examples, the UE 115-b may refrain from using (e.g., drop, skip) at least one uplink resource from the multiple uplink resources scheduled by the DCI. Alternatively, the UE 115-b may apply a frequency shift to at least one uplink resource from the multiple uplink resources scheduled by the DCI. In other examples, the UE 115-b may use an alternate uplink resource to transmit at least one uplink data message from the set of uplink data messages. At 625, the UE 115-b may transmit the uplink control signaling on the set of overlapping uplink resources based on the multiplexing schedule. For example, the UE 115-b may transmit a PRACH message, a PUCCH messages, an SRS, or a combination thereof on the set of overlapping uplink resources. In some examples, the uplink control signaling may be multiplexed (e.g., using FDM) with at least one uplink data message from the set of uplink data messages.

The process flow 600 may support techniques for improved uplink communications between the UE 115-b and the base station 105-b. For example, the described techniques may enable the UE 115-b to multiplex the set of uplink data messages with the uplink control signaling in accordance with the multiplexing configuration, which may increase the likelihood of the base station 105-b successfully receiving the set of uplink data messages, the uplink control signaling, or both. That is, multiplexing the set of uplink data messages with the uplink control signaling may reduce the likelihood of collisions between the set of uplink data messages and the uplink control signaling, which may improve the reliability of communications between the UE 115-b and the base station 105-b. The described techniques may also enable the base station 105-b to employ a more efficient TDRA table structure, which may reduce the signaling overhead associated with multi-PUSCH scheduling, among other benefits.

Figure 7:
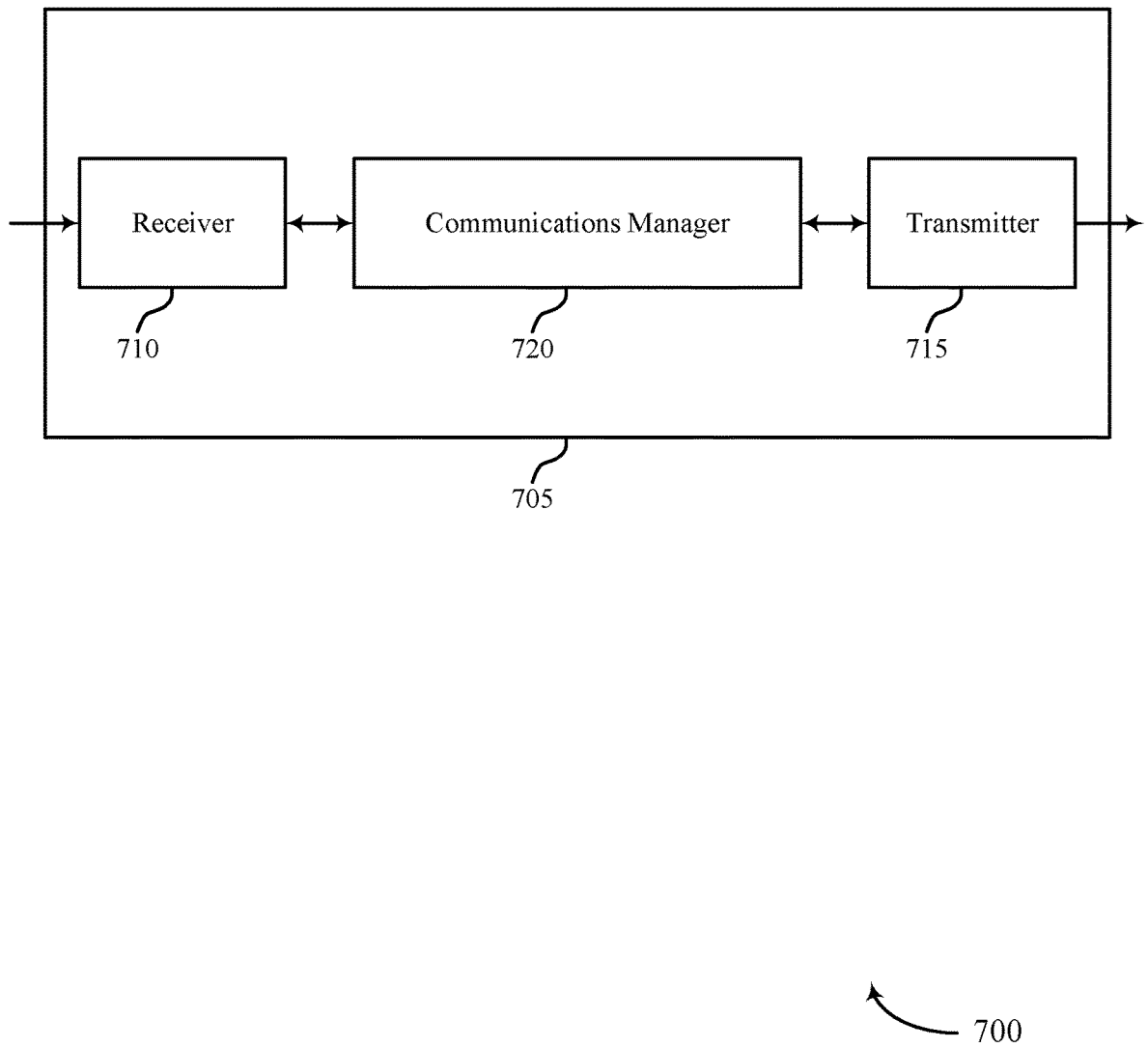
FIGS. 7 and 8 show block diagrams of devices that support multiplexing techniques for uplink transmissions in accordance with aspects of the present disclosure.

FIG. 7 shows a block diagram 700 of a device 705 that supports multiplexing techniques for uplink transmissions in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to multiplexing techniques for uplink transmissions). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to multiplexing techniques for uplink transmissions). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of multiplexing techniques for uplink transmissions as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at the device 705 in accordance with examples as disclosed herein. For example, the communications manager 720 may be configured as or otherwise support a means for receiving, from a base station, DCI that schedules multiple uplink resources for a set of uplink data messages to be transmitted by the device 705. The communications manager 720 may be configured as or otherwise support a means for determining, in accordance with a multiplexing configuration, a multiplexing schedule for multiplexing the set of multiple uplink resources with a set of overlapping uplink resources reserved for uplink control signaling. The communications manager 720 may be configured as or otherwise support a means for transmitting the uplink control signaling and one or more uplink data messages from the set of uplink data messages based on the multiplexing schedule.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced power consumption based on reducing a number of retransmissions performed by the device 705. For example, the described techniques may enable the device 705 to transmit a multi-PUSCH transmission with improved reliability based on reducing a number of collisions between the multi-PUSCH transmission and other uplink signals. Improving the reliability of the multi-PUSCH transmission may reduce a number of times that the device 705 retransmits the multi-PUSCH transmission, which may result in decreased power consumption at the device 705.

Figure 8:
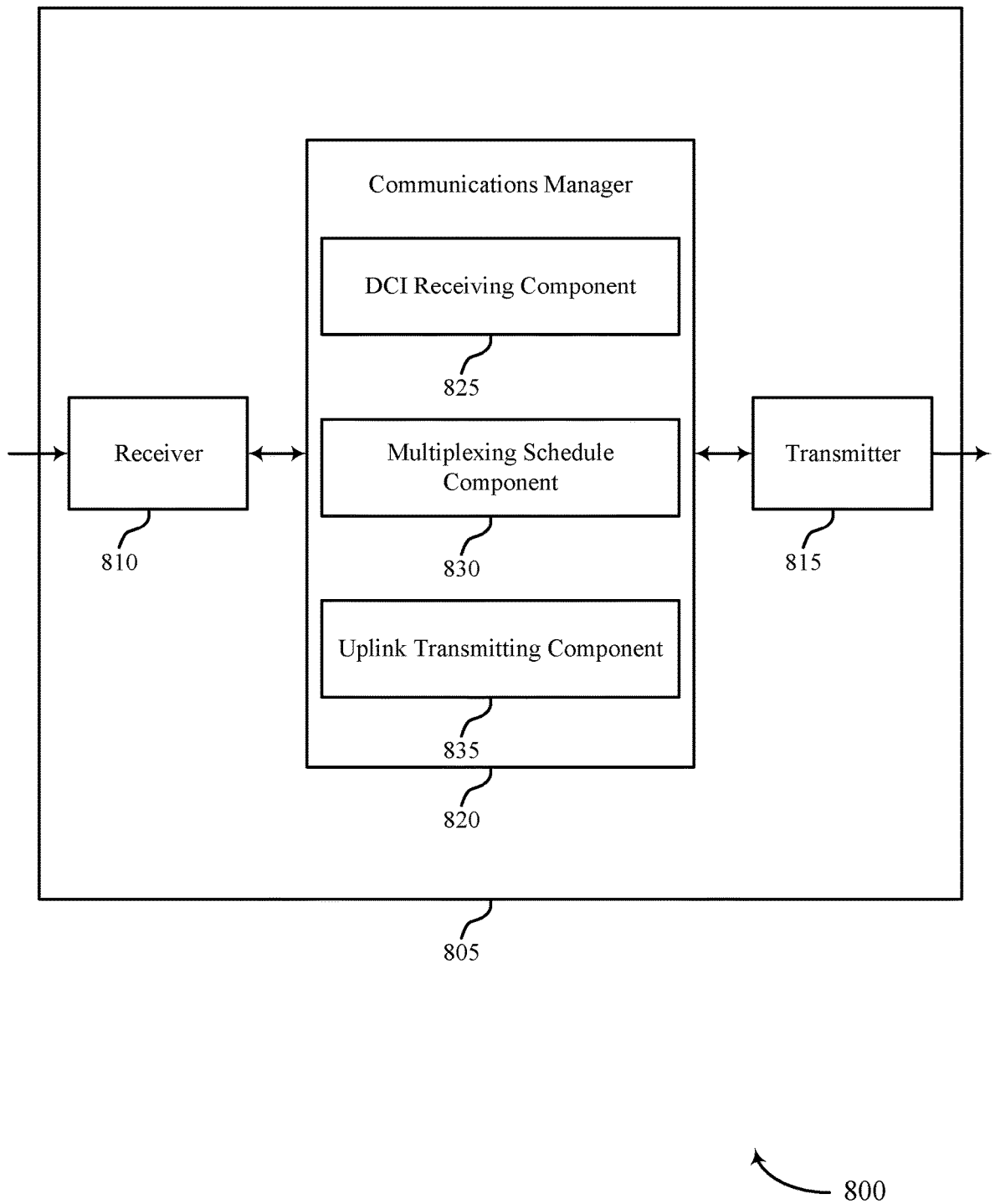

FIG. 8 shows a block diagram 800 of a device 805 that supports multiplexing techniques for uplink transmissions in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to multiplexing techniques for uplink transmissions). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to multiplexing techniques for uplink transmissions). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of multiplexing techniques for uplink transmissions as described herein. For example, the communications manager 820 may include a DCI receiving component 825, a multiplexing schedule component 830, an uplink transmitting component 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at the device 805 in accordance with examples as disclosed herein. The DCI receiving component 825 may be configured as or otherwise support a means for receiving, from a base station, DCI that schedules multiple uplink resources for a set of uplink data messages to be transmitted by the device 805. The multiplexing schedule component 830 may be configured as or otherwise support a means for determining, in accordance with a multiplexing configuration, a multiplexing schedule for multiplexing the set of multiple uplink resources with a set of overlapping uplink resources reserved for uplink control signaling. The uplink transmitting component 835 may be configured as or otherwise support a means for transmitting the uplink control signaling and one or more uplink data messages from the set of uplink data messages based on the multiplexing schedule.

Figure 9:
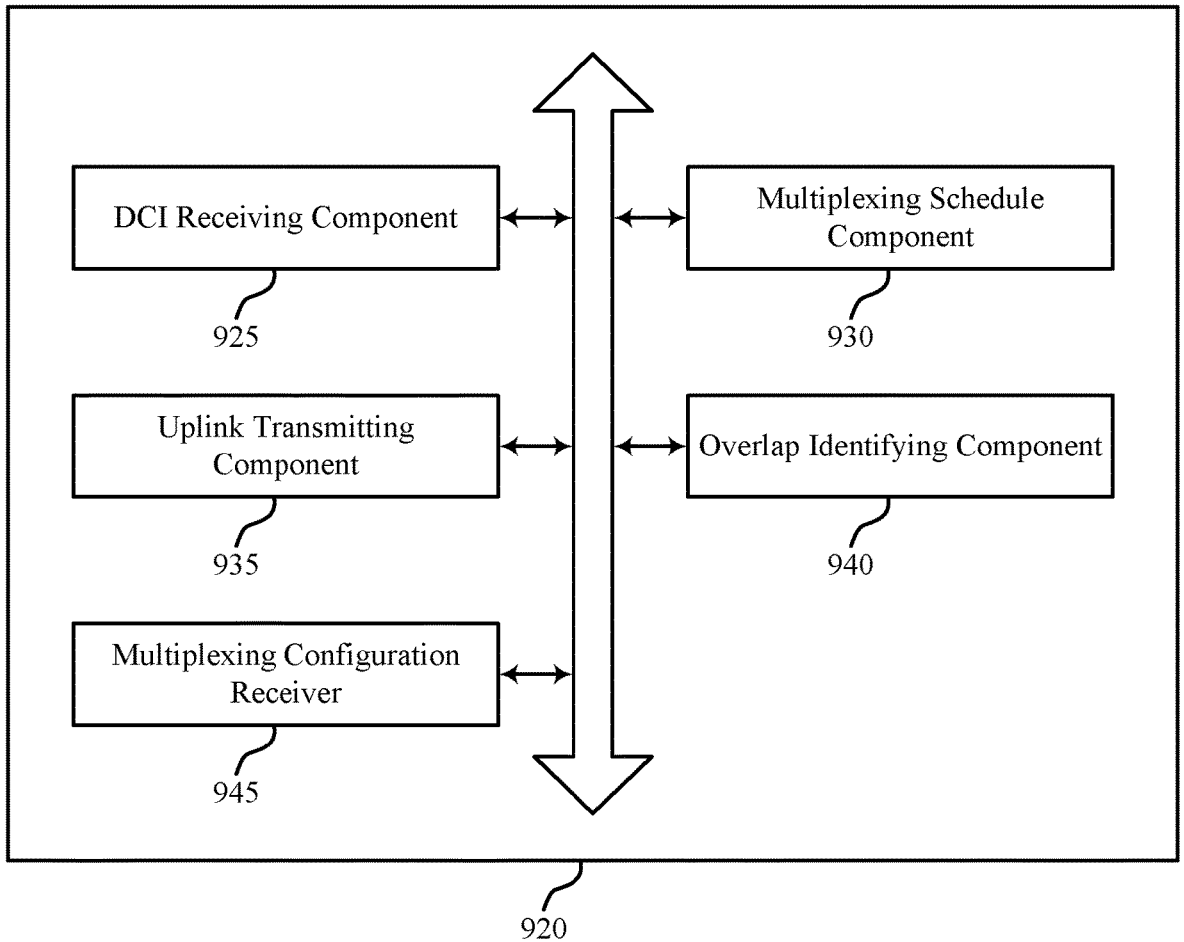
FIG. 9 shows a block diagram of a communications manager that supports multiplexing techniques for uplink transmissions in accordance with aspects of the present disclosure.

FIG. 9 shows a block diagram 900 of a communications manager 920 that supports multiplexing techniques for uplink transmissions in accordance with aspects of the present disclosure. The communications manager 920 may be an example of aspects of a communications manager 720, a communications manager 820, or both, as described herein. The communications manager 920, or various components thereof, may be an example of means for performing various aspects of multiplexing techniques for uplink transmissions as described herein. For example, the communications manager 920 may include a DCI receiving component 925, a multiplexing schedule component 930, an uplink transmitting component 935, an overlap identifying component 940, a multiplexing configuration receiver 945, or any combination thereof. Each of these components may communicate, directly or indirectly, with one another (e.g., via one or more buses).

The communications manager 920 may support wireless communications at the device 905 in accordance with examples as disclosed herein. The DCI receiving component 925 may be configured as or otherwise support a means for receiving, from a base station, DCI that schedules multiple uplink resources for a set of uplink data messages to be transmitted by the device 905. The multiplexing schedule component 930 may be configured as or otherwise support a means for determining, in accordance with a multiplexing configuration, a multiplexing schedule for multiplexing the set of multiple uplink resources with a set of overlapping uplink resources reserved for uplink control signaling. The uplink transmitting component 935 may be configured as or otherwise support a means for transmitting the uplink control signaling and one or more uplink data messages from the set of uplink data messages based on the multiplexing schedule.

In some examples, to support determining the multiplexing schedule, the multiplexing schedule component 930 may be configured as or otherwise support a means for refraining from transmitting uplink data messages on at least one uplink resource from the set of multiple uplink resources in accordance with the multiplexing configuration.

In some examples, to support determining the multiplexing schedule, the multiplexing schedule component 930 may be configured as or otherwise support a means for identifying an alternate uplink resource for transmission of at least one uplink data message from the set of uplink data messages based on a time overlap between the set of multiple uplink resources and the set of overlapping uplink resources reserved for uplink control signaling.

In some examples, to support transmitting the one or more uplink data messages, the uplink transmitting component 935 may be configured as or otherwise support a means for transmitting the at least one uplink data message on the alternate uplink resource based on the multiplexing schedule. In some examples, the multiplexing configuration includes an indication of the alternate uplink resource.

In some examples, to support determining the multiplexing schedule, the multiplexing schedule component 930 may be configured as or otherwise support a means for applying a frequency shift to at least one uplink resource from the set of multiple uplink resources based on a frequency overlap between the at least one uplink resource and the set of overlapping uplink resources reserved for uplink control signaling.

In some examples, to support transmitting the one or more uplink data messages, the uplink transmitting component 935 may be configured as or otherwise support a means for transmitting at least one uplink data message from the set of uplink data messages on the at least one uplink resource based on applying the frequency shift to the at least one uplink resource. In some examples, the at least one uplink data message is FDMed with the uplink control signaling. In some examples, the multiplexing configuration includes an indication to enable or disable the frequency shift, a shift amount for the frequency shift, or both.

In some examples, the overlap identifying component 940 may be configured as or otherwise support a means for identifying one or more RBs or REs from the set of multiple uplink resources that overlap with one or more RBs or REs from the set of overlapping uplink resources reserved for uplink control signaling, where determining the multiplexing schedule is based on the identifying.

In some examples, to support receiving the DCI, the DCI receiving component 925 may be configured as or otherwise support a means for receiving, from the base station, the DCI that includes an indication to refrain from transmitting uplink data messages on at least one uplink resource from the set of multiple uplink resources.

In some examples, the multiplexing configuration receiver 945 may be configured as or otherwise support a means for receiving an indication of the multiplexing configuration from the base station.

In some examples, to support receiving the DCI, the DCI receiving component 925 may be configured as or otherwise support a means for receiving, from the base station, the DCI that includes an indication of a time domain resource allocation table index corresponding to the set of multiple uplink resources. In some examples, the set of multiple uplink resources are continuous in the time domain. In other examples, the set of multiple uplink resources are non-continuous in the time domain.

In some examples, to support transmitting the uplink control signaling, the uplink transmitting component 935 may be configured as or otherwise support a means for transmitting a PRACH message, a PUCCH message, an SRS, or a combination thereof on the set of overlapping uplink resources reserved for uplink control signaling.

In some examples, to support receiving the DCI, the DCI receiving component 925 may be configured as or otherwise support a means for receiving, from the base station, the DCI that schedules multiple PUSCH resources for a set of PUSCH messages to be transmitted by the device 905.

Figure 10:
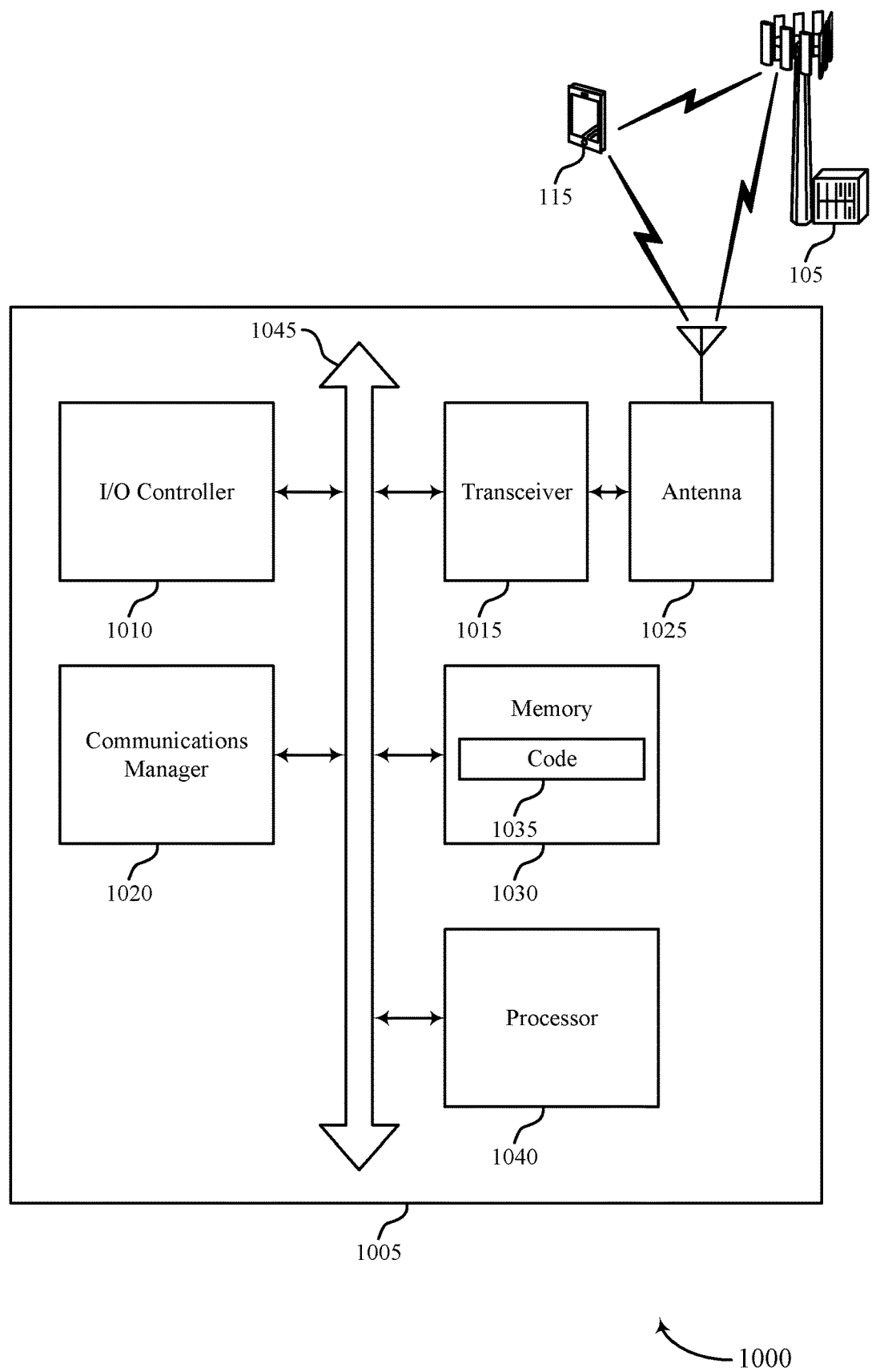
FIG. 10 shows a diagram of a system including a device that supports multiplexing techniques for uplink transmissions in accordance with aspects of the present disclosure.

FIG. 10 shows a diagram of a system 1000 including a device 1005 that supports multiplexing techniques for uplink transmissions in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting multiplexing techniques for uplink transmissions). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at the device 1005 in accordance with examples as disclosed herein. For example, the communications manager 1020 may be configured as or otherwise support a means for receiving, from a base station, DCI that schedules multiple uplink resources for a set of uplink data messages to be transmitted by the device 1005. The communications manager 1020 may be configured as or otherwise support a means for determining, in accordance with a multiplexing configuration, a multiplexing schedule for multiplexing the set of multiple uplink resources with a set of overlapping uplink resources reserved for uplink control signaling. The communications manager 1020 may be configured as or otherwise support a means for transmitting the uplink control signaling and one or more uplink data messages from the set of uplink data messages based on the multiplexing schedule.

By including or configuring the communications manager 1020 in accordance with examples as described herein, the device 1005 may support techniques for transmitting a multi-PUSCH transmission with improved reliability based on reducing a number of collisions between the multi-PUSCH transmission and other uplink signals transmitted by the device 1005. Specifically, the described techniques may enable the device 1005 to multiplex the multi-PUSCH transmission with the other uplink signals if, for example, the multi-PUSCH transmission and the other uplink signals are scheduled on resources that overlap in time, frequency, or both. Multiplexing the multi-PUSCH transmission with the other uplink signals may improve the likelihood of the multi-PUSCH transmission being successfully received, among other benefits.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of multiplexing techniques for uplink transmissions as described herein, or the processor 1040 and the memory 1030 may be otherwise configured to perform or support such operations.

Figure 11:
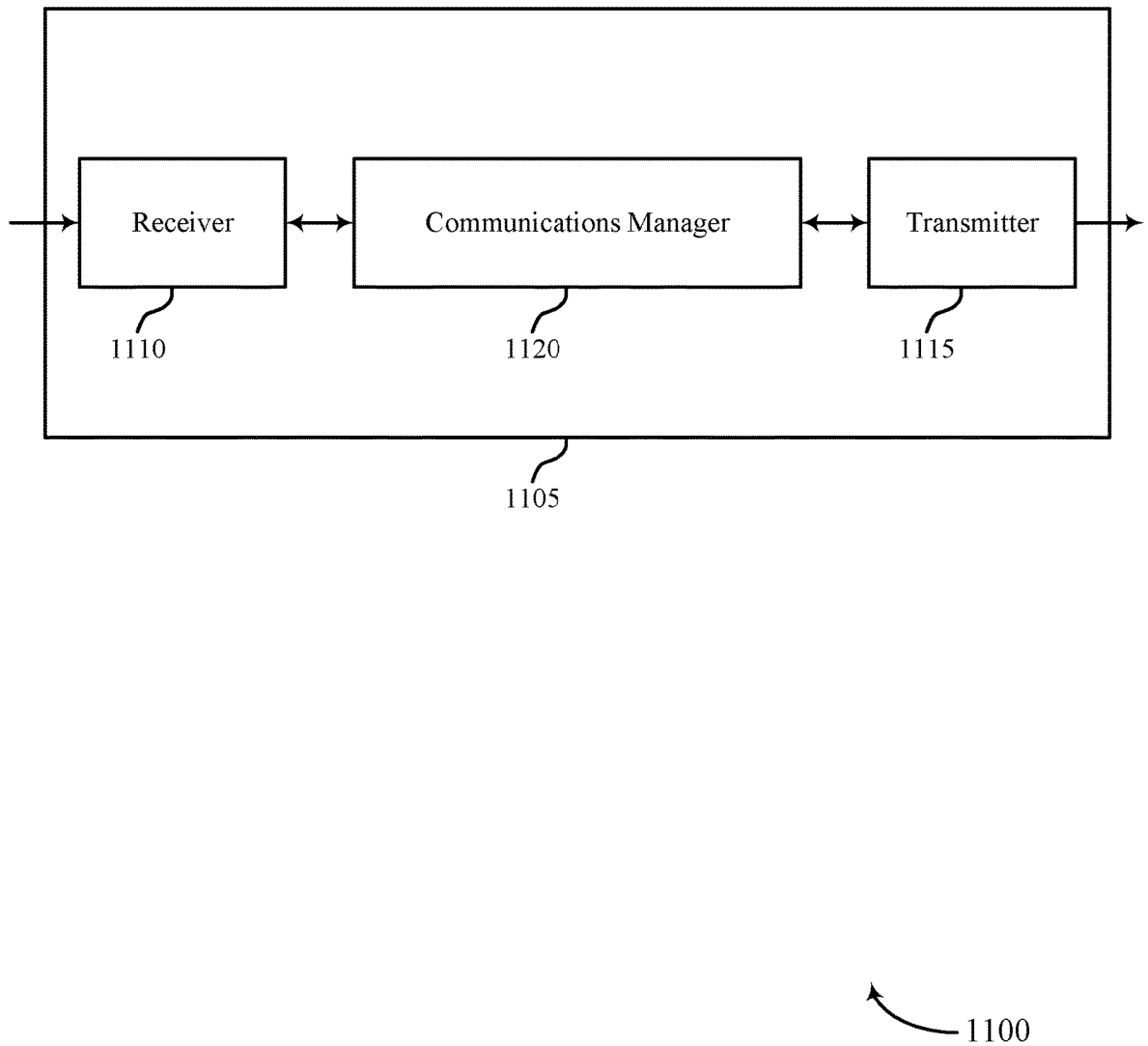
FIGS. 11 and 12 show block diagrams of devices that support multiplexing techniques for uplink transmissions in accordance with aspects of the present disclosure.

FIG. 11 shows a block diagram 1100 of a device 1105 that supports multiplexing techniques for uplink transmissions in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to multiplexing techniques for uplink transmissions). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to multiplexing techniques for uplink transmissions). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of multiplexing techniques for uplink transmissions as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at the device 1105 in accordance with examples as disclosed herein. For example, the communications manager 1120 may be configured as or otherwise support a means for transmitting, to a UE, DCI that schedules multiple uplink resources for a set of uplink data messages to be transmitted by the UE. The communications manager 1120 may be configured as or otherwise support a means for receiving, from the UE and in accordance with a multiplexing configuration, uplink control signaling and one or more uplink data messages from the set of uplink data messages.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced processing based on decreasing the signaling overhead associated with multi-PUSCH scheduling. For example, the described techniques may enable the device 1105 to schedule a multi-PUSCH resource allocation without indicating all possible collision combinations for the multi-PUSCH resource allocation (e.g., in a TDRA table), which may improve the signaling efficiency associated with scheduling the multi-PUSCH resource allocation.

Figure 12:
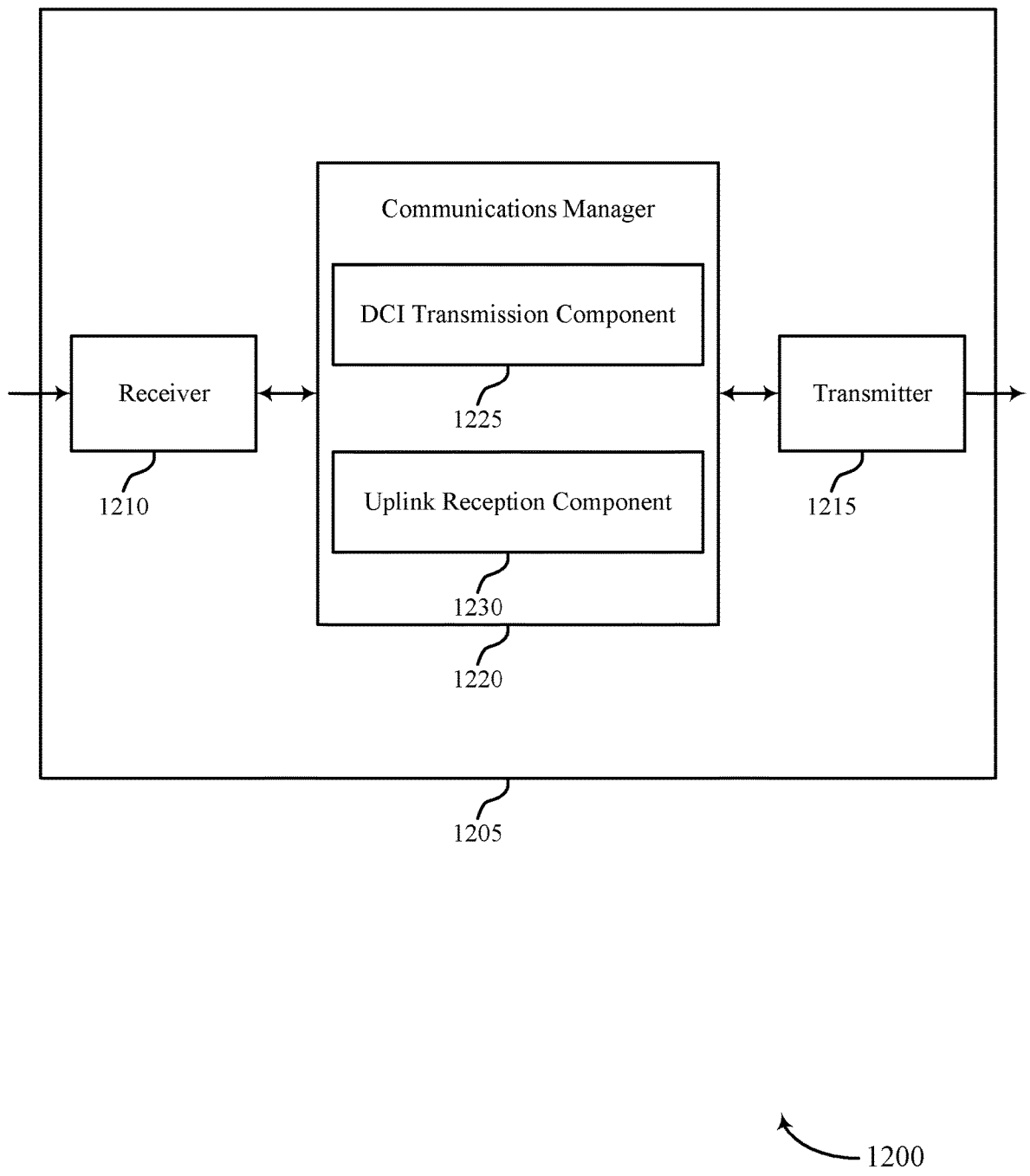

FIG. 12 shows a block diagram 1200 of a device 1205 that supports multiplexing techniques for uplink transmissions in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to multiplexing techniques for uplink transmissions). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to multiplexing techniques for uplink transmissions). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of multiplexing techniques for uplink transmissions as described herein. For example, the communications manager 1220 may include a DCI transmission component 1225 an uplink reception component 1230, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at the device 1205 in accordance with examples as disclosed herein. The DCI transmission component 1225 may be configured as or otherwise support a means for transmitting, to a UE, DCI that schedules multiple uplink resources for a set of uplink data messages to be transmitted by the UE. The uplink reception component 1230 may be configured as or otherwise support a means for receiving, from the UE and in accordance with a multiplexing configuration, uplink control signaling and one or more uplink data messages from the set of uplink data messages.

Figure 13:
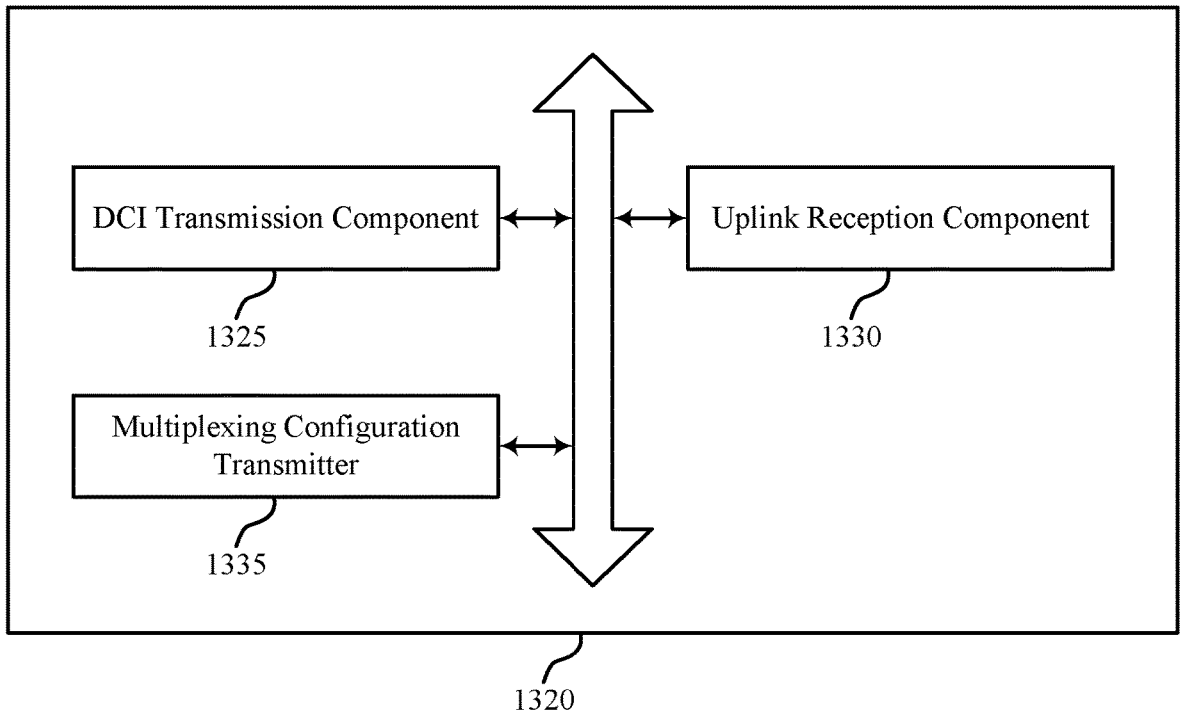
FIG. 13 shows a block diagram of a communications manager that supports multiplexing techniques for uplink transmissions in accordance with aspects of the present disclosure.

FIG. 13 shows a block diagram 1300 of a communications manager 1320 that supports multiplexing techniques for uplink transmissions in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of multiplexing techniques for uplink transmissions as described herein. For example, the communications manager 1320 may include a DCI transmission component 1325, an uplink reception component 1330, a multiplexing configuration transmitter 1335, or any combination thereof. Each of these components may communicate, directly or indirectly, with one another (e.g., via one or more buses).

The communications manager 1320 may support wireless communications at the device 1305 in accordance with examples as disclosed herein. The DCI transmission component 1325 may be configured as or otherwise support a means for transmitting, to a UE, DCI that schedules multiple uplink resources for a set of uplink data messages to be transmitted by the UE. The uplink reception component 1330 may be configured as or otherwise support a means for receiving, from the UE and in accordance with a multiplexing configuration, uplink control signaling and one or more uplink data messages from the set of uplink data messages. In some examples, at least one uplink data message of the one or more uplink data messages is FDMed with the uplink control signaling.

In some examples, the multiplexing configuration transmitter 1335 may be configured as or otherwise support a means for transmitting an indication of the multiplexing configuration to the UE, where the multiplexing configuration includes an indication to enable or disable a frequency shift for the set of multiple uplink resources, an indication of a shift amount for the frequency shift, an indication of an alternate uplink resource for the set of uplink data messages, or a combination thereof.

In some examples, to support transmitting the DCI, the DCI transmission component 1325 may be configured as or otherwise support a means for transmitting, to the UE, the DCI that includes a TDRA table index corresponding to the set of multiple uplink resources. In some examples, the set of multiple uplink resources are continuous in the time domain. In other examples, the set of multiple uplink resources are non-continuous in the time domain.

In some examples, to support transmitting the DCI, the DCI transmission component 1325 may be configured as or otherwise support a means for transmitting, to the UE, the DCI that includes an indication to refrain from transmitting uplink data messages on at least one uplink resource from the set of multiple uplink resources.

In some examples, to support receiving the uplink control signaling, the uplink reception component 1330 may be configured as or otherwise support a means for receiving a PRACH message, a PUCCH message, an SRS, or a combination thereof from the UE on a set of uplink resources that are reserved for uplink control signaling.

In some examples, to support transmitting the DCI, the DCI transmission component 1325 may be configured as or otherwise support a means for transmitting, to the UE, the DCI that schedules multiple PUSCH resources for a set of PUSCH messages to be transmitted by the UE.

Figure 14:
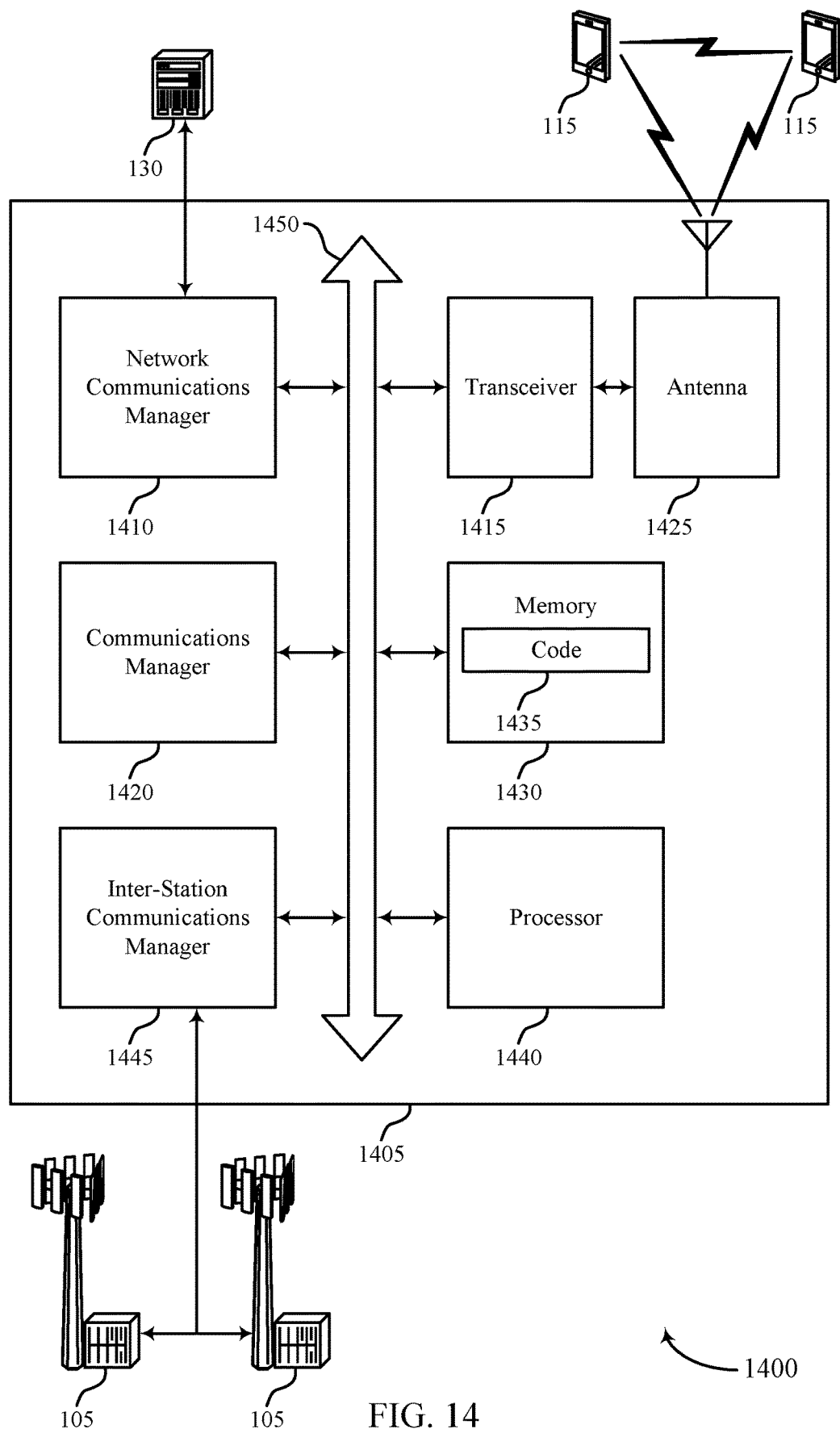
FIG. 14 shows a diagram of a system including a device that supports multiplexing techniques for uplink transmissions in accordance with aspects of the present disclosure.

FIG. 14 shows a diagram of a system 1400 including a device 1405 that supports multiplexing techniques for uplink transmissions in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting multiplexing techniques for uplink transmissions). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at the device 1405 in accordance with examples as disclosed herein. For example, the communications manager 1420 may be configured as or otherwise support a means for transmitting, to a UE, DCI that schedules multiple uplink resources for a set of uplink data messages to be transmitted by the UE. The communications manager 1420 may be configured as or otherwise support a means for receiving, from the UE and in accordance with a multiplexing configuration, uplink control signaling and one or more uplink data messages from the set of uplink data messages.

By including or configuring the communications manager 1420 in accordance with examples as described herein, the device 1405 may support techniques for improved multi-PUSCH scheduling based on configuring a UE with a multiplexing configuration. Specifically, configuring the UE with the multiplexing configuration may enable the device 1405 to perform multi-PUSCH scheduling with lower processing costs, reduced signaling overhead, and fewer delays, among other benefits. The described techniques may also improve the likelihood of the device 1405 successfully receiving multi-PUSCH transmissions, as described herein.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of multiplexing techniques for uplink transmissions as described herein, or the processor 1440 and the memory 1430 may be otherwise configured to perform or support such operations.

Figure 15:
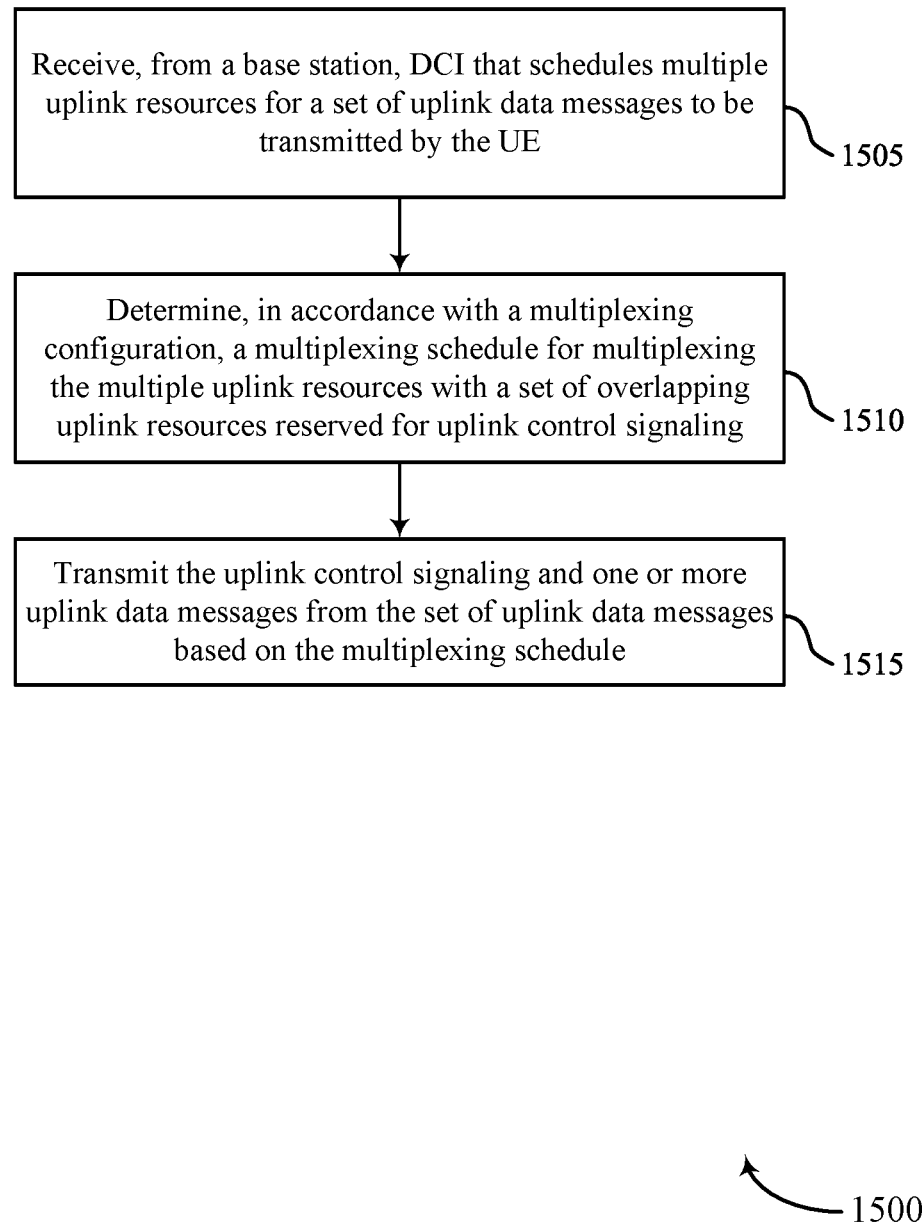
FIGS. 15 through 18 show flowcharts illustrating methods that support multiplexing techniques for uplink transmissions in accordance with aspects of the present disclosure.

FIG. 15 shows a flowchart illustrating a method 1500 that supports multiplexing techniques for uplink transmissions in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, DCI that schedules multiple uplink resources for a set of uplink data messages to be transmitted by the UE. The operations of 1505 may be performed in accordance with examples as disclosed herein. In some examples, aspects of the operations of 1505 may be performed by a DCI receiving component 925 as described with reference to FIG. 9.

At 1510, the method may include determining, in accordance with a multiplexing configuration, a multiplexing schedule for multiplexing the set of multiple uplink resources with a set of overlapping uplink resources reserved for uplink control signaling. The operations of 1510 may be performed in accordance with examples as disclosed herein. In some examples, aspects of the operations of 1510 may be performed by a multiplexing schedule component 930 as described with reference to FIG. 9.

At 1515, the method may include transmitting the uplink control signaling and one or more uplink data messages from the set of uplink data messages based on the multiplexing schedule. The operations of 1515 may be performed in accordance with examples as disclosed herein. In some examples, aspects of the operations of 1515 may be performed by an uplink transmitting component 935 as described with reference to FIG. 9.

Figure 16:
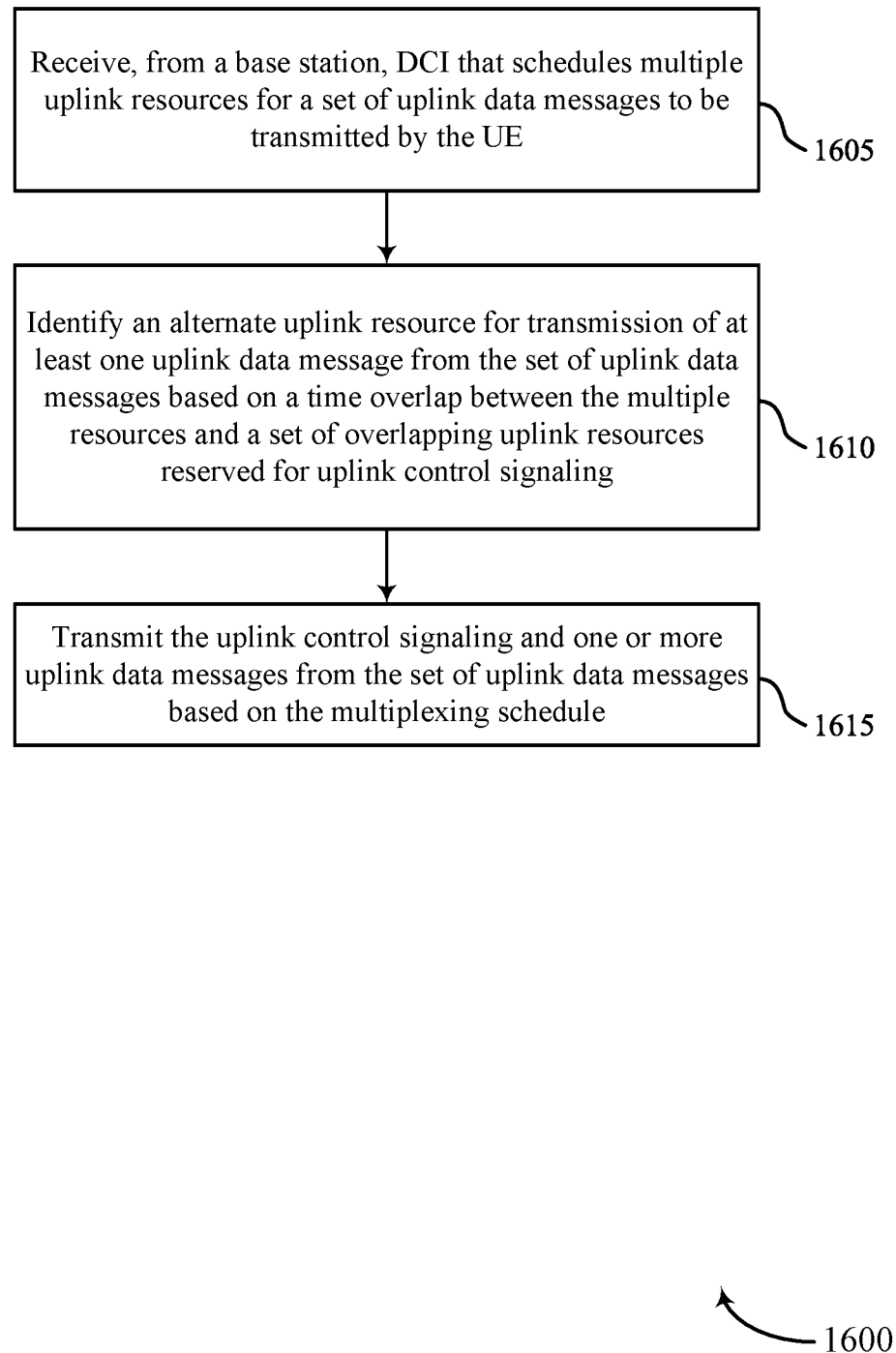

FIG. 16 shows a flowchart illustrating a method 1600 that supports multiplexing techniques for uplink transmissions in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, DCI that schedules multiple uplink resources for a set of uplink data messages to be transmitted by the UE. The operations of 1605 may be performed in accordance with examples as disclosed herein. In some examples, aspects of the operations of 1605 may be performed by a DCI receiving component 925 as described with reference to FIG. 9.

At 1610, the method may include identifying an alternate uplink resource for transmission of at least one uplink data message from the set of uplink data messages based on a time overlap between the set of multiple uplink resources and a set of overlapping uplink resources reserved for uplink control signaling. The operations of 1610 may be performed in accordance with examples as disclosed herein. In some examples, aspects of the operations of 1610 may be performed by a multiplexing schedule component 930 as described with reference to FIG. 9.

At 1615, the method may include transmitting the uplink control signaling and one or more uplink data messages from the set of uplink data messages based on the multiplexing schedule. The operations of 1615 may be performed in accordance with examples as disclosed herein. In some examples, aspects of the operations of 1615 may be performed by an uplink transmitting component 935 as described with reference to FIG. 9.

Figure 17:
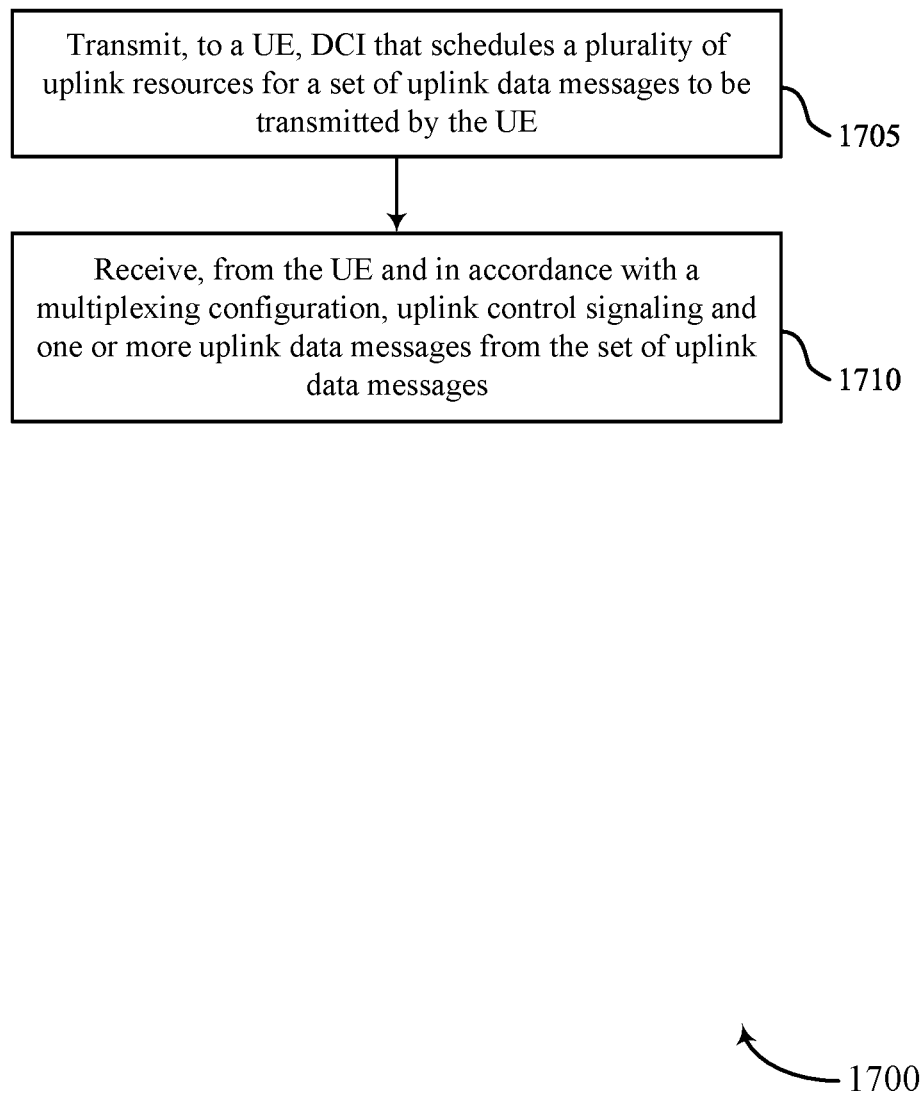

FIG. 17 shows a flowchart illustrating a method 1700 that supports multiplexing techniques for uplink transmissions in accordance with aspects of the present disclosure. The operations of the method 1700 may be implemented by a base station or its components as described herein. For example, the operations of the method 1700 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, DCI that schedules multiple uplink resources for a set of uplink data messages to be transmitted by the UE. The operations of 1705 may be performed in accordance with examples as disclosed herein. In some examples, aspects of the operations of 1705 may be performed by a DCI transmission component 1325 as described with reference to FIG. 13.

At 1710, the method may include receiving, from the UE and in accordance with a multiplexing configuration, uplink control signaling and one or more uplink data messages from the set of uplink data messages. The operations of 1710 may be performed in accordance with examples as disclosed herein. In some examples, aspects of the operations of 1710 may be performed by an uplink reception component 1330 as described with reference to FIG. 13.

Figure 18:
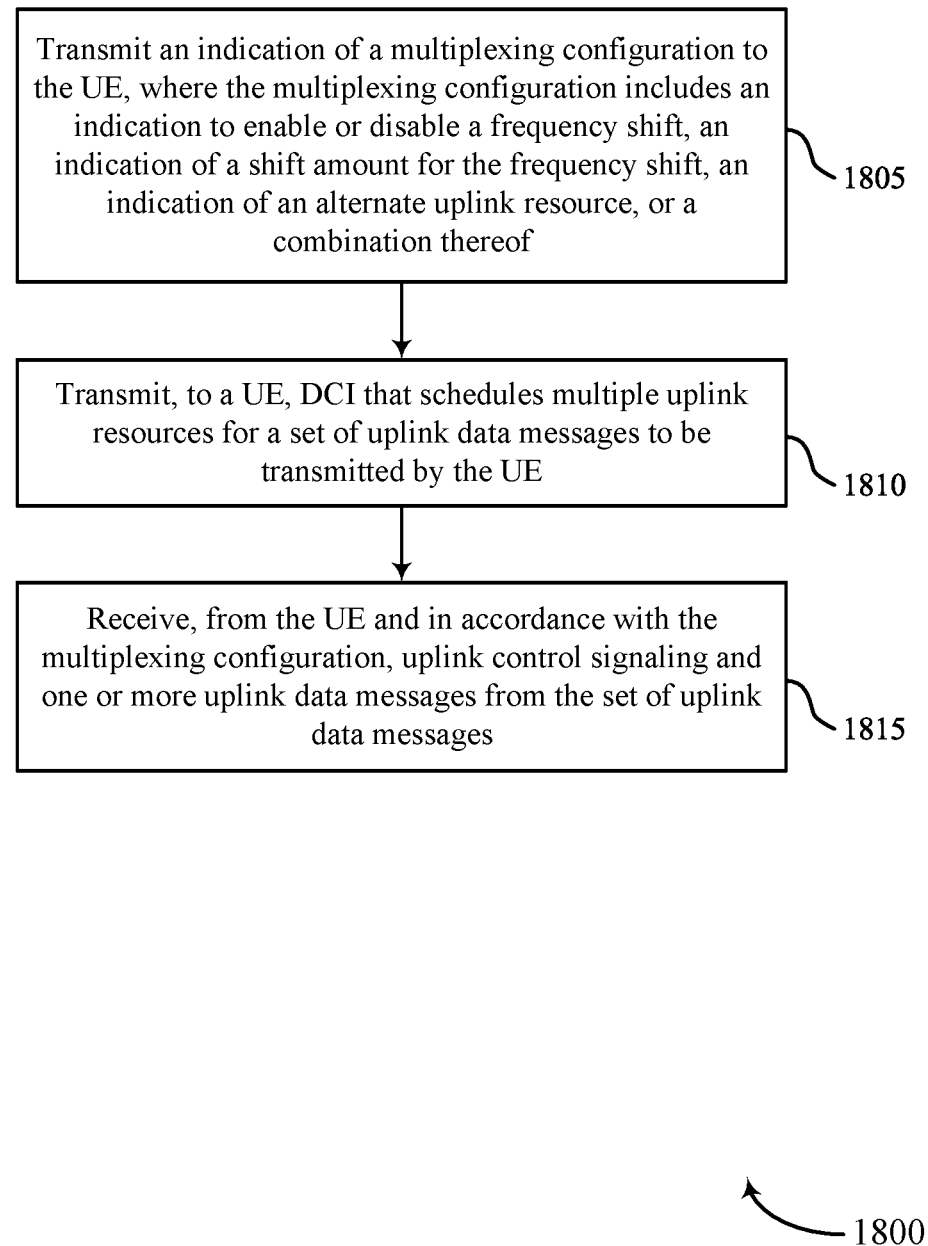

FIG. 18 shows a flowchart illustrating a method 1800 that supports multiplexing techniques for uplink transmissions in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include transmitting an indication of the multiplexing configuration to the UE, where the multiplexing configuration includes an indication to enable or disable a frequency shift, an indication of a shift amount for the frequency shift, an indication of an alternate uplink resource, or a combination thereof. The operations of 1805 may be performed in accordance with examples as disclosed herein. In some examples, aspects of the operations of 1805 may be performed by a multiplexing configuration transmitter 1335 as described with reference to FIG. 13.

At 1810, the method may include transmitting, to a UE, DCI that schedules multiple uplink resources for a set of uplink data messages to be transmitted by the UE. The operations of 1810 may be performed in accordance with examples as disclosed herein. In some examples, aspects of the operations of 1810 may be performed by a DCI transmission component 1325 as described with reference to FIG. 13.

At 1815, the method may include receiving, from the UE and in accordance with the multiplexing configuration, uplink control signaling and one or more uplink data messages from the set of uplink data messages. The operations of 1815 may be performed in accordance with examples as disclosed herein. In some examples, aspects of the operations of 1815 may be performed by an uplink reception component 1330 as described with reference to FIG. 13.

The following provides an overview of aspects of the present disclosure:

Aspect 1: A method for wireless communications at a UE, comprising: receiving, from a base station, downlink control information that schedules a plurality of uplink resources for a set of uplink data messages to be transmitted by the UE; determining, in accordance with a multiplexing configuration, a multiplexing schedule for multiplexing the plurality of uplink resources with a set of overlapping uplink resources reserved for uplink control signaling; and transmitting the uplink control signaling and one or more uplink data messages from the set of uplink data messages based at least in part on the multiplexing schedule.

Aspect 2: The method of aspect 1, wherein determining the multiplexing schedule comprises: refraining from transmitting uplink data messages on at least one uplink resource from the plurality of uplink resources in accordance with the multiplexing configuration.

Aspect 3: The method of any of aspects 1 through 2, wherein determining the multiplexing schedule comprises: identifying an alternate uplink resource for transmission of at least one uplink data message from the set of uplink data messages based at least in part on a time overlap between the plurality of uplink resources and the set of overlapping uplink resources reserved for uplink control signaling.

Aspect 4: The method of aspect 3, wherein transmitting the one or more uplink data messages comprises: transmitting the at least one uplink data message on the alternate uplink resource based at least in part on the multiplexing schedule.

Aspect 5: The method of any of aspects 3 through 4, wherein the multiplexing configuration comprises an indication of the alternate uplink resource.

Aspect 6: The method of any of aspects 1 through 5, wherein determining the multiplexing schedule comprises: applying a frequency shift to at least one uplink resource from the plurality of uplink resources based at least in part on a frequency overlap between the at least one uplink resource and the set of overlapping uplink resources reserved for uplink control signaling.

Aspect 7: The method of aspect 6, wherein transmitting the one or more uplink data messages comprises: transmitting at least one uplink data message from the set of uplink data messages on the at least one uplink resource based at least in part on applying the frequency shift to the at least one uplink resource.

Aspect 8: The method of aspect 7, wherein the at least one uplink data message is frequency division multiplexed with the uplink control signaling.

Aspect 9: The method of any of aspects 6 through 8, wherein the multiplexing configuration comprises an indication to enable or disable the frequency shift, a shift amount for the frequency shift, or both.

Aspect 10: The method of any of aspects 1 through 9, further comprising: identifying one or more resource blocks or resource elements from the plurality of uplink resources that overlap with one or more resource blocks or resource elements from the set of overlapping uplink resources reserved for uplink control signaling, wherein determining the multiplexing schedule is based at least in part on the identifying.

Aspect 11: The method of any of aspects 1 through 10, wherein receiving the downlink control information comprises: receiving, from the base station, the downlink control information that comprises an indication to refrain from transmitting uplink data messages on at least one uplink resource from the plurality of uplink resources.

Aspect 12: The method of any of aspects 1 through 11, further comprising: receiving an indication of the multiplexing configuration from the base station.

Aspect 13: The method of any of aspects 1 through 12, wherein receiving the downlink control information comprises: receiving, from the base station, the downlink control information that comprises an indication of a time domain resource allocation table index corresponding to the plurality of uplink resources.

Aspect 14: The method of any of aspects 1 through 13, wherein transmitting the uplink control signaling comprises: transmitting a physical random access channel message, a physical uplink control channel message, a sounding reference signal, or a combination thereof on the set of overlapping uplink resources reserved for uplink control signaling.

Aspect 15: The method of any of aspects 1 through 14, wherein receiving the downlink control information comprises: receiving, from the base station, the downlink control information that schedules a plurality of physical uplink shared channel resources for a set of physical uplink shared channel messages to be transmitted by the UE.

Aspect 16: The method of any of aspects 1 through 15, wherein the plurality of uplink resources are continuous in the time domain.

Aspect 17: The method of any of aspects 1 through 15, wherein the plurality of uplink resources are non-continuous in the time domain.

Aspect 18: A method for wireless communications at a base station, comprising: transmitting, to a UE, downlink control information that schedules a plurality of uplink resources for a set of uplink data messages to be transmitted by the UE; receiving, from the UE and in accordance with a multiplexing configuration, uplink control signaling and one or more uplink data messages from the set of uplink data messages.

Aspect 19: The method of aspect 18, wherein at least one uplink data message of the one or more uplink data messages is frequency division multiplexed with the uplink control signaling.

Aspect 20: The method of any of aspects 18 through 19, further comprising: transmitting an indication of the multiplexing configuration to the UE, wherein the multiplexing configuration comprises an indication to enable or disable a frequency shift for the plurality of uplink resources, an indication of a shift amount for the frequency shift, an indication of an alternate uplink resource for the set of uplink data messages, or a combination thereof.

Aspect 21: The method of any of aspects 18 through 20, wherein transmitting the downlink control information comprises: transmitting, to the UE, the downlink control information that comprises a time domain resource allocation table index corresponding to the plurality of uplink resources.

Aspect 22: The method of any of aspects 18 through 21, wherein transmitting the downlink control information comprises: transmitting, to the UE, the downlink control information that comprises an indication to refrain from transmitting uplink data messages on at least one uplink resource from the plurality of uplink resources.

Aspect 23: The method of any of aspects 18 through 22, wherein receiving the uplink control signaling comprises: receiving a physical random access channel message, a physical uplink control channel message, a sounding reference signal, or a combination thereof from the UE on a set of uplink resources that are reserved for uplink control signaling.

Aspect 24: The method of any of aspects 18 through 23, wherein transmitting the downlink control information comprises: transmitting, to the UE, the downlink control information that schedules a plurality of physical uplink shared channel resources for a set of physical uplink shared channel messages to be transmitted by the UE.

Aspect 25: The method of any of aspects 18 through 24, wherein the plurality of uplink resources are continuous in the time domain.

Aspect 26: The method of any of aspects 18 through 24, wherein the plurality of uplink resources are non-continuous in the time domain.

Aspect 27: An apparatus for wireless communications at a UE, comprising a processor; memory coupled with the processor; and instructions stored in the memory and executable by the processor to cause the apparatus to perform a method of any of aspects 1 through 17.

Aspect 28: An apparatus for wireless communications at a UE, comprising at least one means for performing a method of any of aspects 1 through 17.

Aspect 29: A non-transitory computer-readable medium storing code for wireless communications at a UE, the code comprising instructions executable by a processor to perform a method of any of aspects 1 through 17.

Aspect 30: An apparatus for wireless communications at a base station, comprising a processor; memory coupled with the processor; and instructions stored in the memory and executable by the processor to cause the apparatus to perform a method of any of aspects 18 through 26.

Aspect 31: An apparatus for wireless communications at a base station, comprising at least one means for performing a method of any of aspects 18 through 26.

Aspect 32: A non-transitory computer-readable medium storing code for wireless communications at a base station, the code comprising instructions executable by a processor to perform a method of any of aspects 18 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
receiving an instance of downlink control information that schedules a first plurality of uplink resources for a plurality of uplink data messages;
transmitting uplink control signaling via at least one uplink resource reserved for the uplink control signaling that overlaps with one or more uplink resources of the first plurality of uplink resources scheduled by the instance of downlink control information; and
transmitting at least a subset of the plurality of uplink data messages via a second plurality of uplink resources based at least in part on a multiplexing schedule associated with a multiplexing configuration of the UE.

2. The method of claim 1, wherein transmitting at least the subset of the plurality of uplink data messages based at least in part on the multiplexing schedule comprises:
refraining from transmitting uplink data messages on at least one uplink resource from the first plurality of uplink resources in accordance with the multiplexing configuration.

3. The method of claim 1, wherein transmitting at least the subset of the plurality of uplink data messages based at least in part on the multiplexing schedule comprises:
identifying an alternate uplink resource for transmission of at least one uplink data message from the plurality of uplink data messages based at least in part on a time overlap between the first plurality of uplink resources and the at least one uplink resource reserved for the uplink control signaling.

4. The method of claim 3, wherein transmitting at least the subset of the plurality of uplink data messages comprises:
transmitting the at least one uplink data message on the alternate uplink resource based at least in part on the multiplexing schedule.

5. The method of claim 3, wherein the multiplexing configuration comprises an indication of the alternate uplink resource.

6. The method of claim 1, wherein transmitting at least the subset of the plurality of uplink data messages based at least in part on the multiplexing schedule comprises:
applying a frequency shift to at least one uplink resource from the first plurality of uplink resources based at least in part on a frequency overlap between the at least one uplink resource and the at least one uplink resource reserved for the uplink control signaling.

7. The method of claim 6, wherein transmitting at least the subset of the plurality of uplink data messages comprises:
transmitting at least one uplink data message from the plurality of uplink data messages on the at least one uplink resource based at least in part on applying the frequency shift to the at least one uplink resource.

8. The method of claim 7, wherein the at least one uplink data message is frequency division multiplexed with the uplink control signaling.

9. The method of claim 6, wherein the multiplexing configuration comprises an indication to enable or disable the frequency shift, a shift amount for the frequency shift, or both.

10. The method of claim 1, further comprising:
identifying one or more resource blocks or resource elements from the first plurality of uplink resources that overlap with one or more resource blocks or resource elements from the at least one uplink resource reserved for the uplink control signaling, wherein determining the multiplexing schedule is based at least in part on the identifying.

11. The method of claim 1, wherein receiving the instance of downlink control information comprises:
receiving the instance of downlink control information that comprises an indication to refrain from transmitting uplink data messages on at least one uplink resource from the first plurality of uplink resources.

12. The method of claim 1, further comprising:
receiving an indication of the multiplexing configuration.

13. The method of claim 1, wherein receiving the instance of downlink control information comprises:
receiving instance of downlink control information that comprises an indication of a time domain resource allocation table index corresponding to the first plurality of uplink resources.

14. The method of claim 1, wherein transmitting the uplink control signaling comprises:
transmitting a physical random access channel message, a physical uplink control channel message, a sounding reference signal, or a combination thereof on the at least one uplink resource reserved for the uplink control signaling.

15. The method of claim 1, wherein receiving the instance of downlink control information comprises:
receiving the instance of downlink control information that schedules a plurality of physical uplink shared channel resources for a set of physical uplink shared channel messages to be transmitted by the UE.

16. The method of claim 1, wherein the first plurality of uplink resources are continuous in time.

17. The method of claim 1, wherein the first plurality of uplink resources are non-continuous in time.

18. The method of claim 1, wherein the second plurality of uplink resources comprises all of the uplink resources of the first plurality of uplink resources except for the one or more uplink resources of the first plurality of uplink resources which overlap with the at least one uplink resource reserved for the uplink signaling.

19. A method for wireless communications at a network device, comprising:
transmitting, to a user equipment (UE), an instance of downlink control information that schedules a first plurality of uplink resources for a plurality of uplink data messages;
receiving uplink control signaling via at least one uplink resource reserved for the uplink control signaling that overlaps with one or more uplink resources of the first plurality of uplink resources scheduled by the instance of downlink control information; and
receiving at least a subset of the plurality of uplink data messages via a second plurality of uplink resources based at least in part on a multiplexing schedule associated with a multiplexing configuration.

20. The method of claim 19, wherein at least one uplink data message of the subset of the plurality of uplink data messages is frequency division multiplexed with the uplink control signaling.

21. The method of claim 19, further comprising:
transmitting an indication of the multiplexing configuration to the UE, wherein the multiplexing configuration comprises an indication to enable or disable a frequency shift for the first plurality of uplink resources, an indication of a shift amount for the frequency shift, an indication of an alternate uplink resource for the plurality of uplink data messages, or a combination thereof.

22. The method of claim 19, wherein transmitting the instance of downlink control information comprises:
transmitting, to the UE, the instance of downlink control information that comprises a time domain resource allocation table index corresponding to the first plurality of uplink resources.

23. The method of claim 19, wherein transmitting the instance of downlink control information comprises:
transmitting, to the UE, the instance of downlink control information that comprises an indication to refrain from transmitting uplink data messages on at least one uplink resource from the first plurality of uplink resources.

24. The method of claim 19, wherein receiving the uplink control signaling comprises:
receiving a physical random access channel message, a physical uplink control channel message, a sounding reference signal, or a combination thereof from the UE on the at least one uplink resource reserved for the uplink control signaling.

25. The method of claim 19, wherein transmitting the instance of downlink control information comprises:
transmitting, to the UE, the instance of downlink control information that schedules a plurality of physical uplink shared channel resources for a set of physical uplink shared channel messages to be transmitted by the UE.

26. The method of claim 19, wherein the first plurality of uplink resources are continuous in time.

27. An apparatus for wireless communications at a user equipment (UE), comprising:
a processor;
memory coupled with the processor; and
instructions stored in the memory and executable by the processor to cause the apparatus to:
receive an instance of downlink control information that schedules a first plurality of uplink resources for a plurality of uplink data messages;
transmit uplink control signaling via at least one uplink resource reserved for the uplink control signaling that overlaps with one or more uplink resources of the first plurality of uplink resources scheduled by the instance of downlink control information; and
transmit at least a subset of the plurality of uplink data messages via a second plurality of uplink resources based at least in part on a multiplexing schedule associated with a multiplexing configuration of the UE.

28. The apparatus of claim 27, wherein the instructions to transmit at least the subset of the plurality of uplink data messages based at least in part on the multiplexing schedule are executable by the processor to cause the apparatus to:
identify an alternate uplink resource for transmission of at least one uplink data message from the plurality of uplink data messages based at least in part on a time overlap between the first plurality of uplink resources and the at least one uplink resource reserved for the uplink control signaling.

29. The apparatus of claim 27, wherein the instructions to transmit at least the subset of the plurality of uplink data messages based at least in part on the multiplexing schedule are executable by the processor to cause the apparatus to:
apply a frequency shift to at least one uplink resource from the first plurality of uplink resources based at least in part on a frequency overlap between the at least one uplink resource and the at least one uplink resource reserved for the uplink control signaling.

30. An apparatus for wireless communications at a network device, comprising:
a processor;
memory coupled with the processor; and
instructions stored in the memory and executable by the processor to cause the apparatus to:
transmit, to a user equipment (UE), an instance of downlink control information that schedules a first plurality of uplink resources for a plurality of uplink data messages;
receive uplink control signaling via at least one uplink resource reserved for the uplink control signaling that overlaps with one or more uplink resources of the first plurality of uplink resources scheduled by the instance of downlink control information; and
receive at least a subset of the plurality of uplink data messages via a second plurality of uplink resources based at least in part on a multiplexing schedule associated with a multiplexing configuration.

* * * * *